(12) United States Patent  (10) Patent No.: US 7,380,697 B2
Seki et al.  (45) Date of Patent: Jun. 3, 2008

(54) WELDING CONDITION MONITORING DEVICE

(75) Inventors: Hideo Seki, Sayama (JP); Sukeyuki Shinotsuka, Sayama (JP); Makoto Furukawa, Sayama (JP); Koji Oda, Sayama (JP); Keiji Otsuka, Sayama (JP); Jiro Kirita, Sayama (JP); Nobuhiro Fueki, Sayama (JP); Hironori Watanabe, Sayama (JP)

(73) Assignee: Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 339 days.

(21) Appl. No.: 10/641,587

(22) Filed: Aug. 12, 2003

(65) Prior Publication Data

US 2004/0124227 A1 Jul. 1, 2004
US 2008/0061113 A9 Mar. 13, 2008

Related U.S. Application Data

(63) Continuation of application No. PCT/JP02/00922, filed on Feb. 5, 2002.

(30) Foreign Application Priority Data

Feb. 14, 2001 (JP) ............................... 2001-81675
Apr. 13, 2001 (JP) .............................. 2001-153195
Apr. 13, 2001 (JP) .............................. 2001-153196
Apr. 13, 2001 (JP) .............................. 2001-153197
May 11, 2001 (JP) .............................. 2001-180838

(51) Int. Cl.
*B23K 35/12* (2006.01)
*B23K 37/00* (2006.01)

(52) U.S. Cl. ............................. 228/102; 228/8; 228/9; 228/103; 228/104; 228/105

(58) Field of Classification Search ..................... None
See application file for complete search history.

(56) References Cited

U.S. PATENT DOCUMENTS

| | | | | | |
|---|---|---|---|---|---|
| 4,943,702 | A | * | 7/1990 | Richardson | 219/124.34 |
| 6,137,860 | A | * | 10/2000 | Ellegood et al. | 378/58 |
| 6,204,469 | B1 | * | 3/2001 | Fields et al. | 219/121.6 |
| 6,751,342 | B2 | * | 6/2004 | Shepard | 382/141 |
| 2004/0090545 | A1 | * | 5/2004 | Shinotsuka et al. | 348/234 |
| 2005/0012847 | A1 | * | 1/2005 | Nakajima et al. | 348/365 |

FOREIGN PATENT DOCUMENTS

| | | | | |
|---|---|---|---|---|
| JP | 58157596 | A | * | 9/1983 |
| JP | 61140384 | A | * | 6/1986 |
| JP | 09225666 | A | * | 9/1997 |
| JP | 2000-329616 | | | 11/2000 |
| JP | 2000329616 | A | * | 11/2000 |
| JP | 2001191187 | A | * | 7/2001 |
| JP | 2001259883 | A | * | 9/2001 |

* cited by examiner

*Primary Examiner*—Kiley Stoner
(74) *Attorney, Agent, or Firm*—Fulbright & Jaworski LLP

(57) ABSTRACT

A welding condition monitoring device for monitoring the welding state of a welding work portion by taking an image thereof by an image sensor having a wide dynamic range and capable of taking an image covering a very bright welding portion and relatively dark portion. The monitoring device selectively emphasizes the outputs of the image sensor for any of luminance areas of the image taken by the image sensor using a sensor output characteristic table and can provide an image clearly showing both the very bright welding portion and the dark bead portion with a sufficient contrast allowing an observer to reliably recognize the objects in the image.

43 Claims, 21 Drawing Sheets

BB  L2        BA  L1  BS

BB L2   BA   L1   BS

WELDING CONDITION MONITORING DEVICE

BACKGROUND OF THE INVENTION

The present invention relates to a welding condition monitoring device capable of visually monitoring a welding state of a welding work portion of an object being weld by a welding machine by an image taken therefrom by an image sensor.

Generally, the welding operation of a modern laser welding machine is monitored by an image taken from a currently welding position by an image sensor, which image is used for inspecting the welding conditions.

FIG. 29 shows an image of a surface of members being joined together by the heat of a laser beam of a laser welder. The image is comprised of a welding portion of metal melted at high temperature by the heat of a laser beam, a molten pool and a bead formed by solidification of weld metal behind the molten pool. To estimate the quality of a weld joint to be formed, it is necessary to monitor a high luminance welding portion and a low luminance bead portion on the same image. For this purpose, it is necessary to use an image sensor having a wide dynamic range for luminosity. If an image sensor having a narrow dynamic range is applied for the above-described application, it cannot present a complete image distinctly showing both of a high luminance welding portion and a low luminance bead portion. In other words, the image taken by the image sensor having an insufficient dynamic range shows a clear bright welding work portion with an invisibly darkened bead portion or a clear bead portion with an unclear bright welding portion with halation.

Japanese Laying-Open Patent Publication No. 2000-329616 discloses a CMOS-type image sensor having a logarithmic output characteristic for attaining a wide dynamic range, which uses a matrix of light sensor circuits each of which represents a unit pixel and, as shown in FIG. 2, comprises a photodiode PD for producing therein a sensor current proportional to the quantity of incident light Ls falling thereon, a transistor Q1 for converting the sensor current produced in the photodiode PD into a voltage signal Vpd having a logarithmic characteristic in a weak inverse state, a transistor Q2 for amplifying the voltage signal Vpd and a transistor Q3 for outputting the amplified voltage signal at a timing pulse Vs generated by a reading-out signal.

In the above-described image sensor, the sensor circuit, as shown in FIG. 3, may present a logarithmic output characteristic with a sufficient sensor current corresponding to the quantity of incident light falling thereon but it presents a linear (non-logarithmic) output characteristic with a small sensor current because of a delay in responding to charging/discharging of the parasitic capacity of the photodiode PD.

In case of monitoring a welding state of a welding work portion by an image taken therefrom by an image sensor using light sensor circuits each having a logarithmic output characteristic with a wide dynamic range, the image covering a wide range of luminosity from a very light portion to a dark portion may be observed but may suffer insufficient contrast of the image because of logarithmic compression of the luminance.

A recent laser welding machine is provided with a monitoring device for observing the welding state of a welding work portion on a work being welded thereon by an image taken by a camera (image sensor) to check and control the current welding conditions.

In FIG. 29, there is shown a state of a welding work portion of metals being joined together by heat of a laser beam moving in the direction indicated by an arrow, which portion comprises a molten pool BA of metal melted at a very high temperature by heat of a laser beam and a bead portion BB formed by solidification of molten metal behind the molten pool. In FIG. 29, BS designates a welding position currently being irradiated by a laser beam spot.

To visually estimate the quality of welding work, it is necessary to take by a camera a sequence of images each showing both a high luminance molten pool BA and a low luminance bead portion BB of metals being joined together by laser welding and display each image on the same monitor screen.

If a CCD camera having a narrow dynamic range is used to take an image of a welding work portion, it may present an image of the object with a clear light molten pool BA and an invisibly darkened bead portion BB (at a large diaphragm value suitable for taking a highlight portion image) or a clear bead portion and a molten pool unclear with halation (at a small diaphragm value suitable for taking a dark portion image).

Accordingly, an object image taken by a single CCD camera does not allow the observer to grasp the welding states of the molten pool BA and the bead portion BB. When a CCD camera is used for taking an image of the same object by alternately changing over the aperture size (or filter) from one suitable for taking an image of the light molten pool BA to another suitable for taking an image of the dark bead portion BB and reverse, it cannot achieve real-time monitoring of the states of the molten pool BA and the bead portion BB. Therefore, the conventional method takes at the same time two images I1 and I2 of a molten pool BA and a bead portion respectively, as shown in FIG. 34, by using two sets of CCD cameras and combines two images to present a real-time view of the object on a monitor screen. In FIG. 34, H indicates the halation and f1 and f2 indicate surface defects of the bead portion BB respectively.

When a plurality of cameras having a narrow dynamic range are used for separately taking an image of a highlight portion and an image of a relatively dark bead portion in the welding work portion of an object being welded by a welding machine such as a laser welder, arc welder and electron beam welder, each of the cameras requires separate positioning to take a specified portion following the welding process, complicating the monitoring system.

In the case of making a decision on the welding condition of a welding work portion by analyzing data obtained from the respective images taken by plural cameras, it is necessary to perform complicated processing of the image data.

Generally, the operation of a welding machine working on a transfer line for automatically welding respective works to be successively transferred to a specified position thereon shall be monitored by views taken by cameras and optimally controlled so as to ensure the sufficient quality of the weld products.

In this instance, when using the welding machine to conduct butt-welding or lap-welding of respective works to be successively transferred to the welding station on the line, it is necessary to monitor whether the welding machine always maintains its welding head at a constant distance from the work set on the welding machine based on data of images taken by the cameras. This condition is requisite for obtaining the quality of the weld product.

If a CCD camera having a narrow dynamic range is used in that case for monitoring the welding work portion, it may be adjusted by enlarging its aperture to obtain a clear image of a very light portion of the object being welded or by reducing its aperture to obtain a clear image of a relatively dark portion.

The above adjustment may result in appearing on the image a darkened invisible portion corresponding to a portion irradiated by a weakened laser beam in the teaching stage for positioning a laser beam thereon before the welding operation or may result in halation of the highlight portion on the image.

Accordingly, images clearly showing both of a low luminance portion and a high luminance portion in the actual welding process may be taken by necessarily changing over the aperture size of the camera or exchanging the filter thereof one for another.

In monitoring whether a constant distance of a welding head from a work being welded is maintained on a welding machine such as a laser welder, arc welder and electronic beam welder, the conventional monitoring method using a camera having a narrow dynamic range requires frequent changing-over of the aperture size or exchanging filters of the camera so as to present sequence of images of the work being welded, which are clear in both the low luminance portion (irradiated by a weak laser beam in a teaching stage before welding) and the high luminance portion (irradiated by an intense laser beam in the actual welding process). This requires the monitoring system to perform complicated operations.

SUMMARY OF THE INVENTION

Accordingly, the present invention has as its object the provision of a welding condition monitoring device for monitoring the welding state of a welding work portion by a sequence of images taken therefrom by an image sensor having a wide dynamic range for luminosity covering a very bright portion currently welded and relatively dark bead portion, which is capable of enhancing the contrast of the bright welding portion and the bead portion shown in an image taken by the image sensor by emphasizing corresponding sensor outputs in any luminance ranges by using a output characteristic conversion table for the image sensor.

Another object of the present invention is to provide a welding condition monitoring device for monitoring a welding state of a welding work portion by a sequence of images taken therefrom by an image sensor, wherein the image sensor is a single set of CMOS (complementary metal oxide semiconductor transistor) type camera having a wide dynamic range enough to take an image covering both the very bright molten pool of a welding portion and the less bright bead portion, which camera is integrally attached to a welding head for taking the view of the welding work portion.

Another object of the present invention is to provide a welding condition monitoring device for observing a welding state of a welding work portion by a sequence of images taken therefrom by a CMOS camera, which is provided with an image data processing means for reading-in data of images taken by the camera for the purpose of examining the current welding condition.

Another object of the present invention is to provide a welding condition monitoring device for observing the welding state of a welding work portion by a sequence of images taken therefrom by a CMOS type camera, which is further provided with an image data processing means for determining a displacement of a welding position based on data of images taken by the camera and a means for correcting the welding position based on a determined value of the displacement.

Another object of the present invention is to provide a welding condition monitoring device for observing a welding state of a welding work portion by a sequence of images taken therefrom by a CMOS type camera which has a logarithmic output characteristic with a dynamic range wide enough to present a clear view of a low luminance portion irradiated by a weak laser beam in a set-up or teaching stage before the welding operation as well as a clear view of a very bright portion irradiated by an intense laser beam in the actual welding process and which is used as attached to a welding head of the welding machine.

Another object of the present invention is to provide a welding condition monitoring device for observing a welding state of a welding work portion of an object being welded by a distant welding machine for welding the object with no contact therewith by a sequence of images taken therefrom by a CMOS type camera, wherein the CMOS type camera attached to the welding head is first adjusted to a specified angle at which the camera takes a bright spot (of laser beam) irradiating the welding portion of the object and then adjusts its level, i.e., the height level of the welding head with respect to the object by using a adjusting means in such a manner that the bright spot is always located at a specified position on the view seen by the CMOS type camera, thus maintaining the camera at a constant distance from the object being welded by the welding head.

PREFERRED EMBODIMENTS OF THE INVENTION

Figure 1:
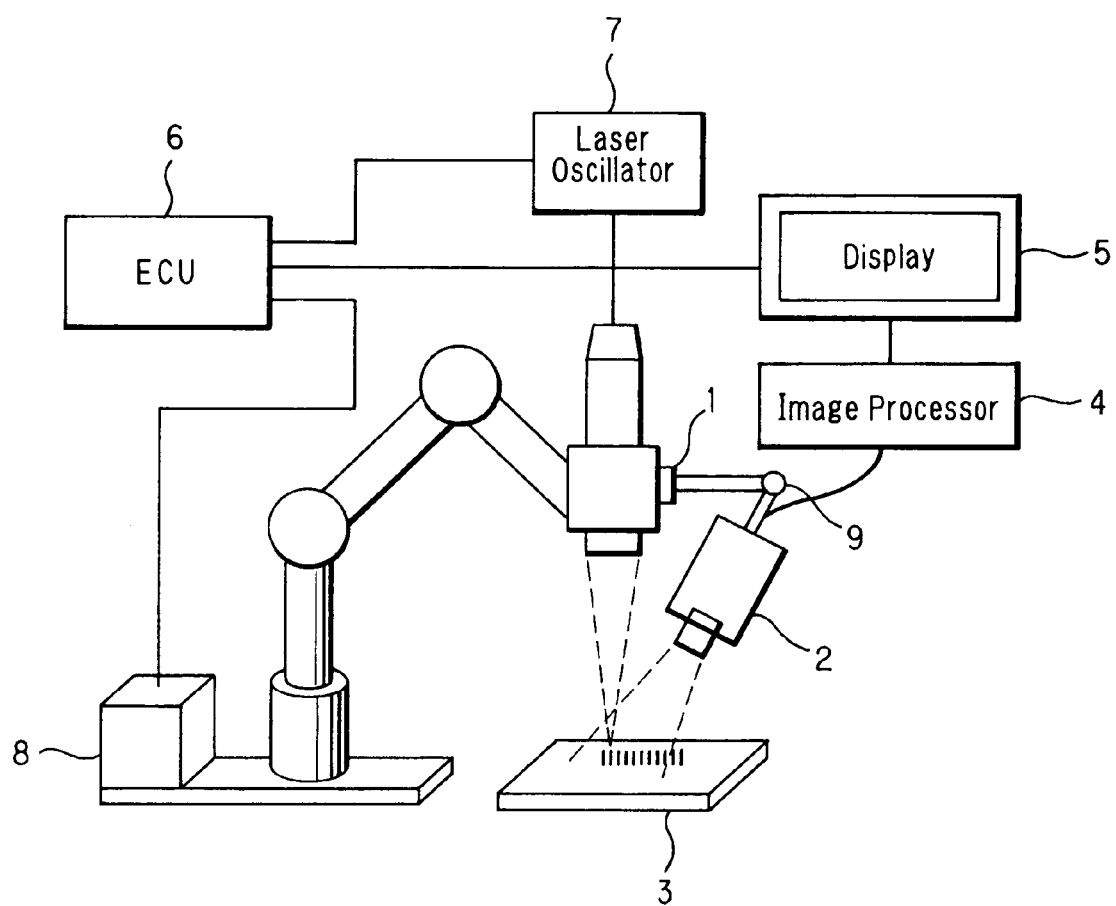
FIG. 1 is a schematic construction view of a welding condition monitoring device according to an embodiment of the present invention.

FIG. 1 illustrates an exemplary construction of a welding condition monitoring system in which a CMOS type camera 2 comprising an image sensor is attached to a portion of a welding head 1 of a laser beam welding robot for taking an image of a welding work portion of members 3 to be joined together. The image taken by the camera is transferred to an image processing unit 4 whereby it is processed and then displayed on a screen of a display unit 5. At the same time, the image processing unit 4 examines the welding condition based on data from the image taken by the CMOS camera and transfers the resultant data to an electronic control unit (ECU) 6 which in turn changeably controls parameters of welding conditions such as a welding position and laser beam intensity in accordance with the observed welding state. In FIG. 1, numerals 7 and 8 designate a laser oscillator and a robot driver respectively. All components are operated under the control from the ECU 6.

Figure 2:
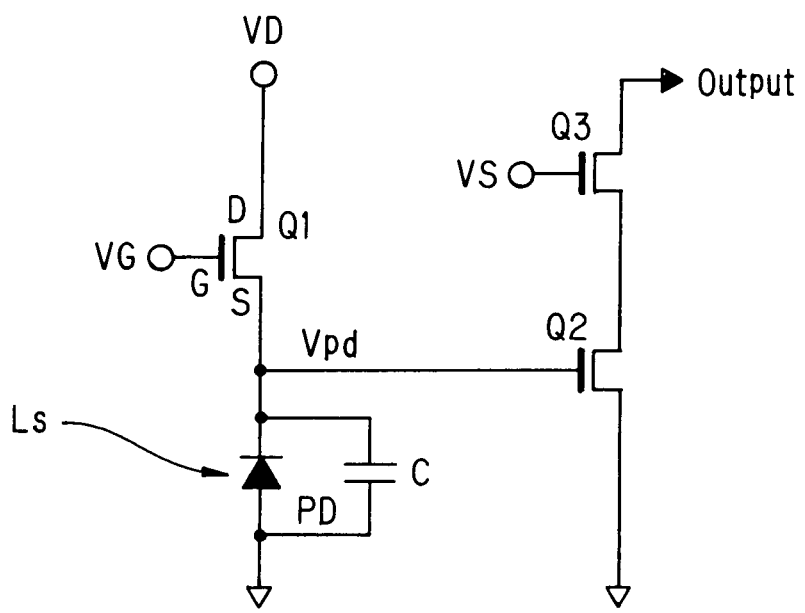
FIG. 2 is a circuit diagram depicting an exemplary construction of a light sensor circuit composing a unit pixel of an image sensor.
Figure 3:
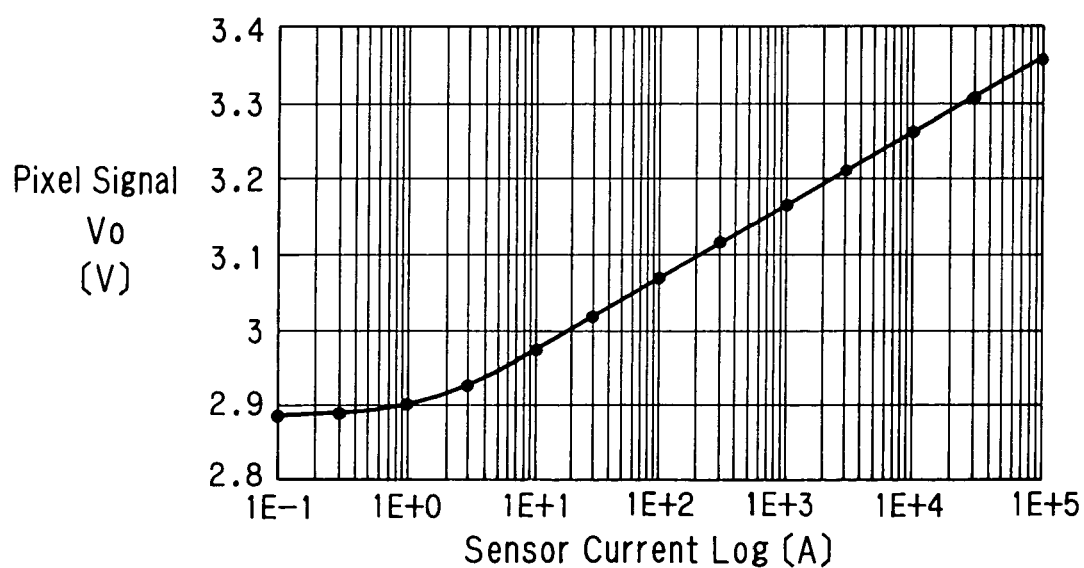
FIG. 3 shows an output characteristic of a sensor output (pixel signal) representing a sensor current flowing in the photodiode, which current corresponds to a quantity of incident light falling on the light sensor circuit.

The CMOS type camera 2 uses an image sensor which is composed of a number of light sensor circuits each of which represents a unit pixel as shown in FIG. 2.

Each light sensor circuit can produce a sensor current in the transistor Q1 while a sufficient quantity of light Ls is falling on the photodiode PD and can therefore detect a light signal at a response speed sufficient not to produce an afterimage of the pixel owing to a relatively small value of resistance of the transistor Q1. However, the transistor Q1 is set to operate with resistance increased by one order when a current therein decreases by one order, so a decrease in the current flowing in the transistor Q1 with a decrease in the quantity of incident light Ls falling on the photodiode PD causes the transistor Q1 to rapidly increase its resistance. A time constant of the circuit containing a parasitic capacitor C of the photodiode PD with the increased resistance is increased to elongate time necessary for removing electric charge accumulated in the parasitic capacitor C. Namely, an afterimage can be viewed for a longer duration as the quantity of incident light Ls decreases. In this instance, if a pixel signal is output at an interval of 1/30 seconds with a small quantity of sensor current, e.g., 1E-12A corresponding to a small quantity Ls of incident light falling on the photodiode, a voltage signal Vpd cannot be saturated within the interval (1/30 sec.).

Figure 28:
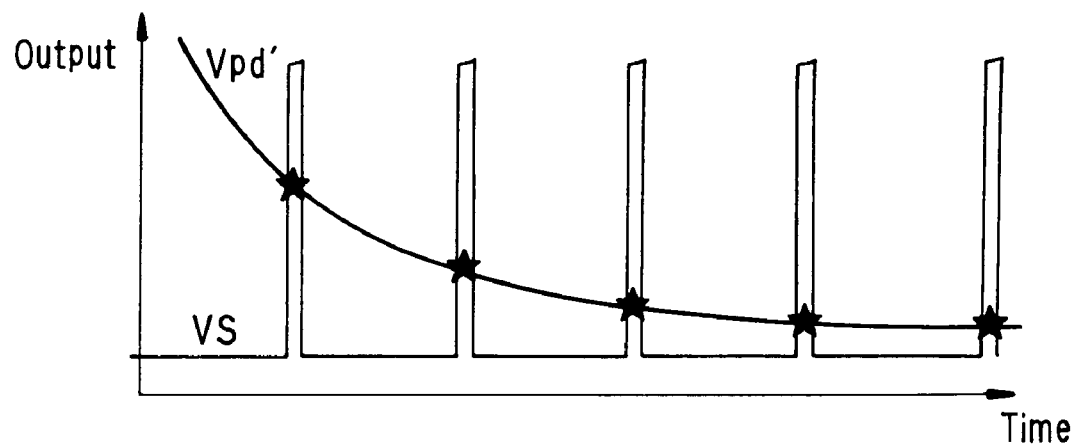
FIG. 28 is a timing chart of reading-out of pixel signals from a light sensor circuit without initialization thereof and with a small quantity of incident light falling thereon.

Therefore, if a pixel signal Vo is output in accordance with timing pulses of a reading signal Vs as shown in FIG. 28 with a small quantity of sensor current, an output appears with an afterglow that may be of a higher level at an earlier time because of the elongated time for saturating the voltage signal Vpd. In FIG. 28, Vpd' designates an inverse amplified voltage signal produced by the amplifying transistor Q2.

The light sensor circuit is therefore provided with a means of initializing itself before detecting a light signal by removing electric charge accumulated in the parasitic capacitor C of the photodiode PD by changing a drain voltage VD of the MOS transistor Q1 to a level lower than a normal for a specified period. This enables the light sensor circuit to immediately obtain a voltage signal corresponding to the quantity of light falling on the photodiode at that time even if a sensor current rapidly changed. Thus, the light sensor circuit may not cause afterglow of the pixel even with a small quantity of incident light Ls.

Figure 4:
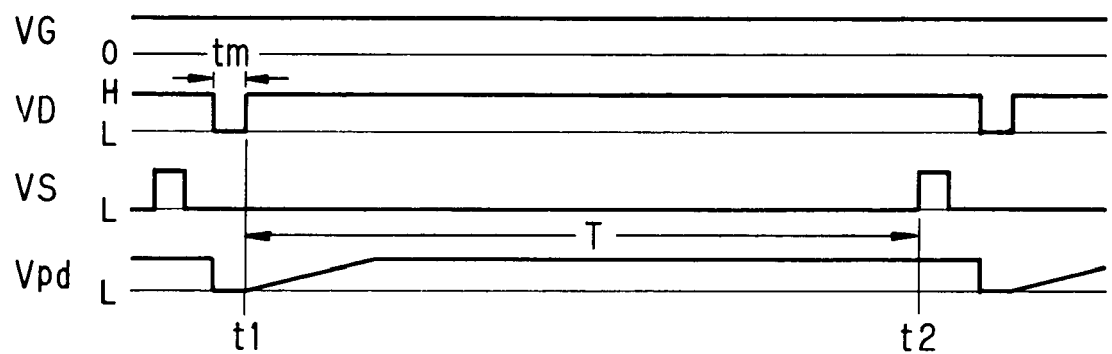
FIG. 4 is a time chart of signals generated by respective portions of a light sensor circuit.

FIG. 4 shows a time chart of signals produced at various portions of the light sensor circuit in the above-described case. In FIG. 4, t1 is an initializing timing pulse and t2 is a light-signal detection timing pulse. A specified time tm for which the drain voltage VD of the transistor Q1 is changed from a normal value (high level H) to a lower voltage value (low level L) and kept at the low level L is set for example to about 5 microseconds in case of reading a pixel at a speed of about 100 nanoseconds. In FIG. 4, T designates a period for accumulating a charge in the parasitic capacitor C of the photodiode PD, which period is about $\frac{1}{30}$ (or $\frac{1}{60}$) seconds for a NTSC signal.

In the light sensor circuit, once the drain voltage VD of the transistor Q1 was switched over to the low level L for initializing the circuit, the transistor Q1 is brought into the low-resistance state if a potential between the gate voltage VG and the drain voltage VD is greater than a threshold value of the transistor Q1. Therefore, the source side potential at that moment becomes equal to the drain voltage VD (the source voltage becomes equal to the drain voltage for n-MOS transistor), causing the junction capacitor C of the photodiode PD to be discharged.

Figure 5:
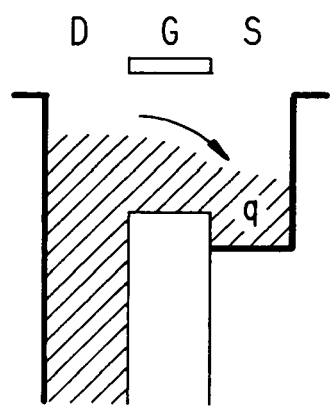
FIG. 5 is a mimic illustration of the operation of a transistor Q1 with a flow of an electric charge q therein when initializing the light sensor circuit.

FIG. 5 is a mimic illustration of the operation of the transistor Q1 with a flow of electric charge q therein when initializing the light sensor circuit.

Once the drain voltage VD of the transistor Q1 was changed to the normal value (high level H) with the elapse of time tm and a light signal was then detected; the source side potential becomes lower than the drain voltage VD. If the difference between the gate voltage VG and the drain voltage VD is larger than the threshold, the MOS transistor Q1 reaches the low-resistance state and allows the junction capacitor C of the photodiode to be charged again.

Figure 6:
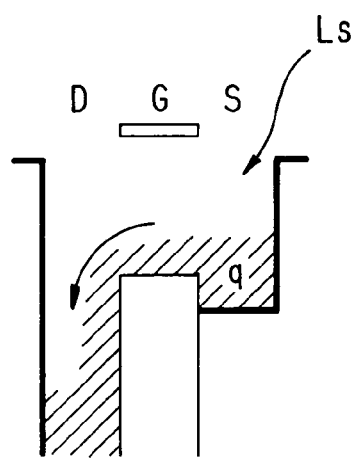
FIG. 6 is a mimic illustration of the operation of a transistor Q1 with a flow of an electric charge q therein when detecting a light signal by the light sensor circuit.

FIG. 6 is a mimic illustration of the operation of the transistor Q1 with a flow of electric charge q therein when initializing the light sensor circuit.

The junction capacitor C of the photodiode PD is discharged for initializing the light sensor circuit before detecting a light signal and then recharged. In this case, the output voltage Vpd (a terminal voltage of the photodiode PD) with the elapse of a specified time from the initializing timing becomes a value corresponding to the quantity of incident light Ls. Namely, the light sensor circuit after initialization can obtain a discharging characteristic with a specified time constant in response to a change in the quantity of incident light.

In that case, if the light sensor circuit is left as it is for a long time, a current supplied from the drain voltage VD through the transistor Q1 becomes equal to a current flowing in the photodiode PD. The same discharging characteristic can be thus always maintained as far as no charge remains. This eliminates the possibility of afterglow of the pixel.

The light sensor circuit can therefore obtain a sensor signal Vo corresponding to the quantity of incident light Ls with no afterglow of the pixel by detecting a light signal with the elapse a specified time after initialization of the circuit.

Figure 7:
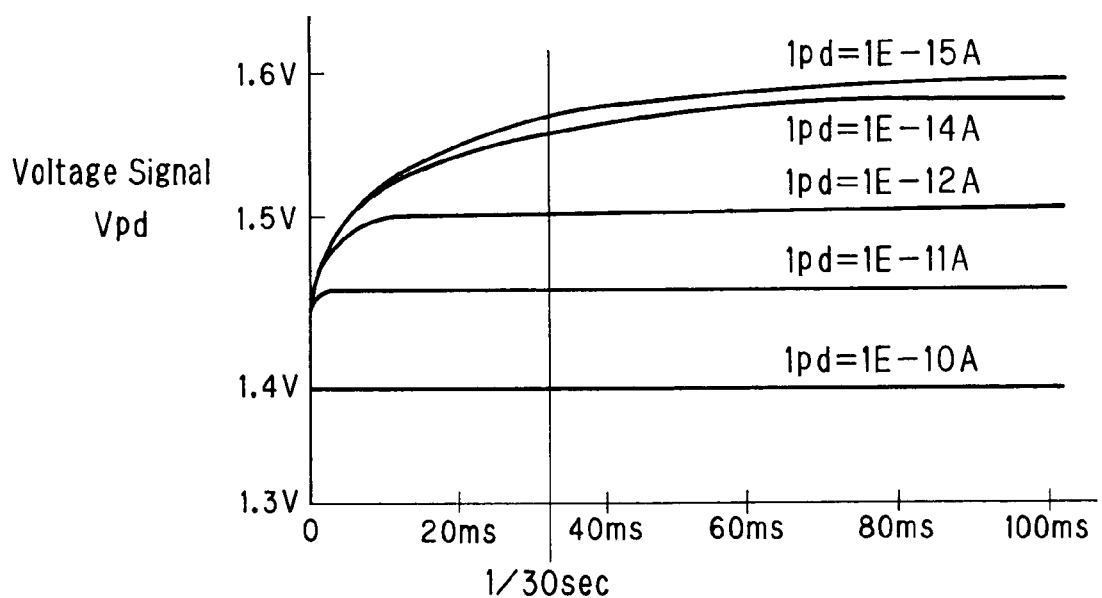
FIG. 7 shows a difference in rising time of a voltage signal Vpd in accordance with a difference in intensity of incident light Ls falling on the light sensor circuit.

FIG. 7 shows a difference in the rising time of a voltage signal Vpd with a change in the intensity of incident light falling on the light sensor circuit.

Figure 8:
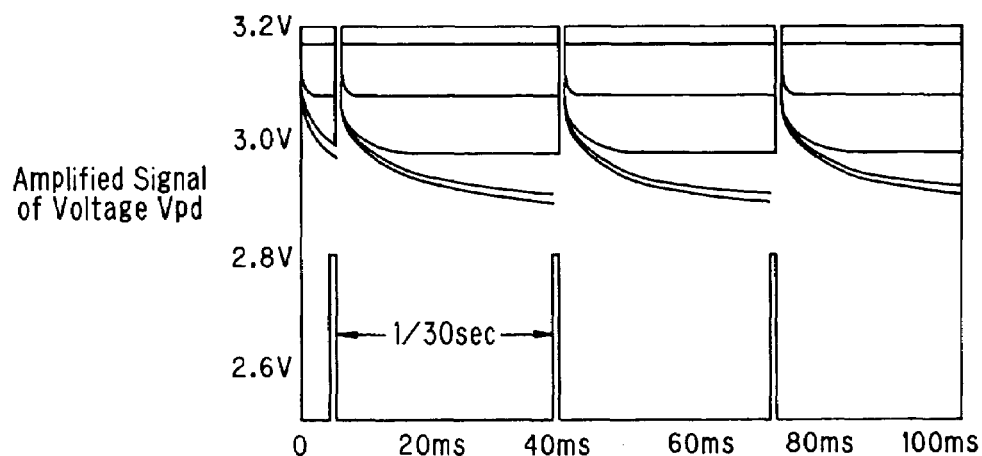
FIG. 8 shows characteristic curves of an amplified voltage signal Vpd when repeating reading-out of a light signal at a specified timing in the light sensor circuit.

FIG. 8 shows characteristic curves of an amplified voltage signal Vpd when the light signals were repeatedly read at an interval of $\frac{1}{30}$ sec. This diagram indicates that characteristics of signals obtained at $\frac{1}{30}$-sec. intervals correspond to the sensor current proportional to the quantity of incident light Ls falling on the photodiode PD with no effect of afterglow of the pixel.

Figure 9:
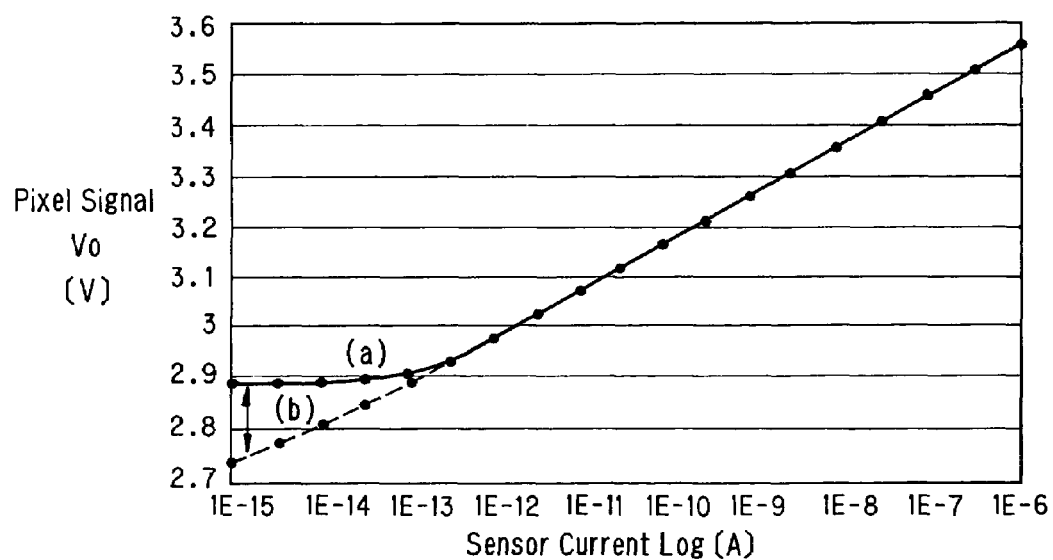
FIG. 9 shows a change of an output characteristic of a pixel signal Vo with a change in quantity Ls of incident light falling on a photodiode PD.

FIG. 9 shows output characteristic curves of a pixel signal Vo obtained by changing a sensor current proportional to the quantity of incident light falling on the photodiode PD. The diagram indicates that the sensor signal has a complete logarithmic output characteristic at a sensor current of 1E-13A or more in the photodiode PD. It is also found that the output signal characteristic is not logarithmic at a sensor current of less than 1 E-13A but does not cause afterglow.

The diagram also indicates that the output characteristic (a) shown in FIG. 9 can be obtained by adjusting the threshold of the low level L to which the drain voltage VD of the transistor Q1 must be changed over and by decreasing the drain voltage until the transistor Q1 reaches the state of completely low resistance. On the contrary, the normal logarithmic output characteristic (b) shown in FIG. 9 can be obtained by setting the control voltage VD to the same value that the gate voltage VG has.

Therefore, the output characteristic (a) of FIG. 9 is free from the effect of a pixel afterglow but the light signal detecting sensitivity is decreased at a small quantity of incident light while the output characteristic (b) of FIG. 9 may attain high detection sensitivity at a small quantity of incident light but may have a remarkable afterglow. In other words, there is a trade-off relation between the detection sensitivity and the afterglow.

Therefore, it is desirable to adjust the drain voltage VD of the transistor to obtain the output characteristic in an intermediate region between the output characteristic (a) shown in FIG. 9 and the logarithmic output characteristic (b) shown in FIG. 9 on the following condition:

For the applications where the afterglow is permitted, the drain voltage of the transistor must be set to a value at which the higher detection sensitivity is obtained. On the contrary, for the applications where the afterglow must be avoided, the drain voltage must be set to a value at which no afterglow may be produced. In practice, the drain voltage VD is adjusted to a value selected for obtaining the highest detection sensitivity in view of the actual application and the actually permissible afterglow.

Figure 10:
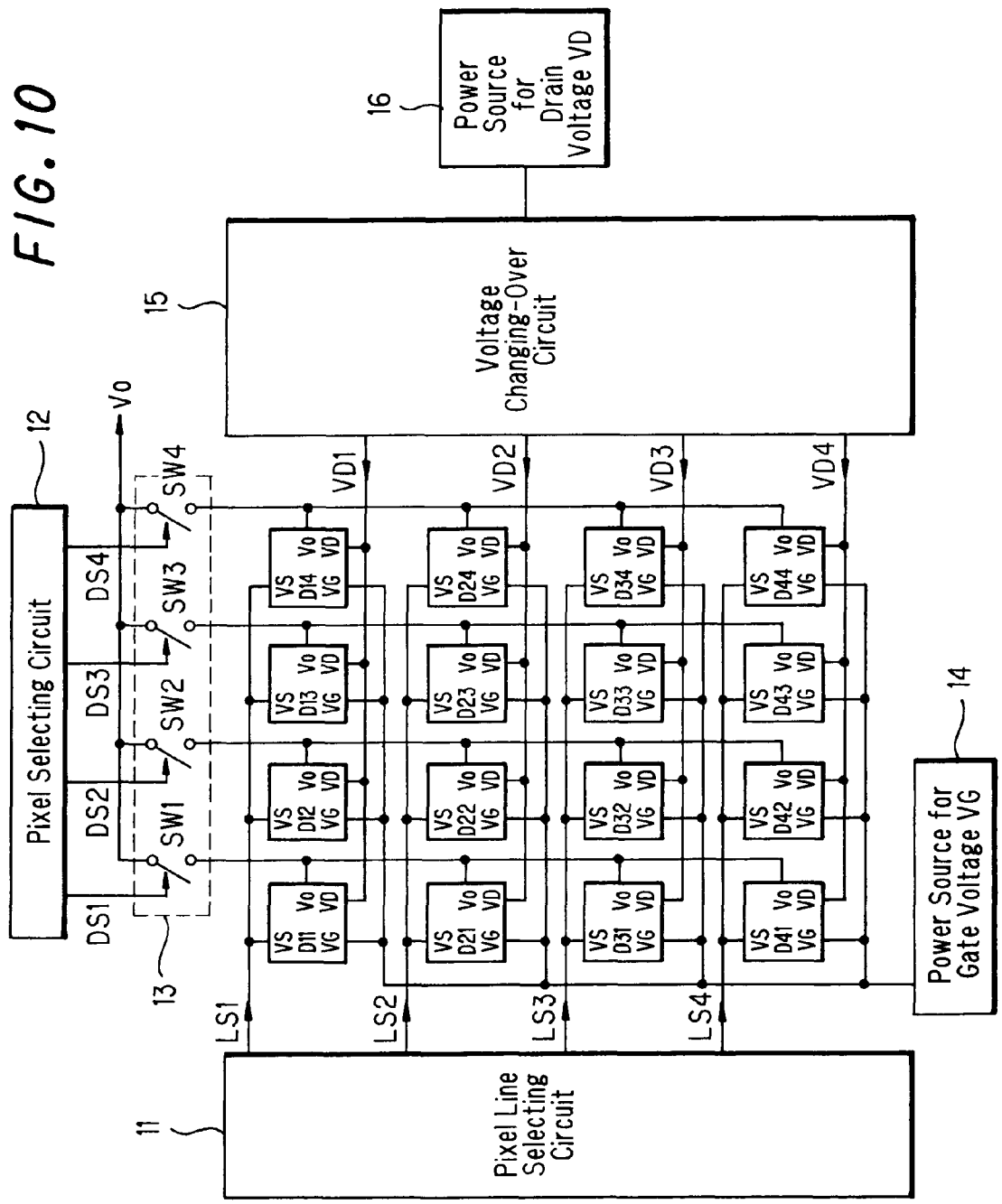
FIG. 10 is a block diagram showing an exemplary construction of an image sensor composed of a number of light sensor circuits each representing a unit pixel.

FIG. 10 an exemplary construction of an image sensor having a number of the above-described light sensor circuits arranged to form a matrix of pixels, wherein sensor signals from respective pixels are read by scanning in a time series and the pixels can be, initialized in time adapted to the readout-scanning of respective sensor signals.

The image sensor is composed of 4×4 pixels D11~D44 arranged in a matrix of pixel circuits, in which pixel lines are selected one by one with respective selecting signals LS1~LS4 successively output from a pixel line selecting circuit 11 and pixels in each selected pixel line are readout one by one as respective sensor signals in such a manner that selecting signals DS11~DS44 successively output from a pixel selecting circuit 12 turn on corresponding switches SW1~SW4 (in a group 13 of switches) to read respective pixel signals Vo in a time series. In FIG. 10, numeral 14 designates a power source for gate voltage VG of the transistor Q1 and numeral 16 designates a power source for a drain voltage VD of the transistor Q1.

The image sensor is provided with a voltage switching-over circuit 15 by which a drain voltage VD of each transistor Q1 for each pixel is changed from a normal high-level H to an initializing lower level L and reverse by the effect of specified timing pulses when selecting each line of pixels.

Figure 11:
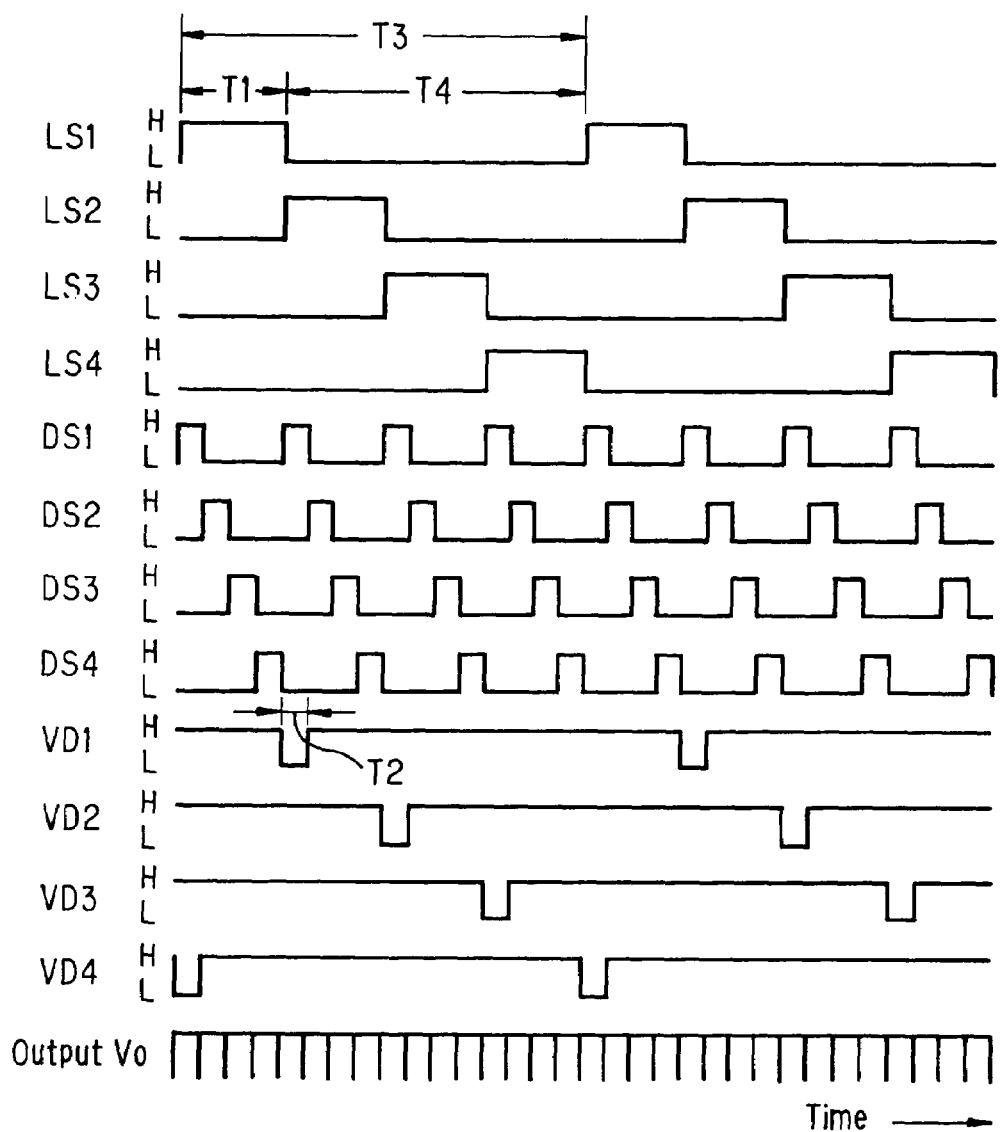
FIG. 11 is a time chart of signals generated by respective portions of the image sensor of FIG. 10.

The operation of the above-described image sensor to which the present invention is applied will be described with reference to FIG. 11 showing a time chart of signals generated at respective portions of the image sensor.

Once the pixel-line selecting signal LS1 reached the high level H, the first pixel line including pixels D11, D12, D13 and D14 is selected and, during a specified period T1 of the signal LS1 remaining at the high level H, pixel selecting signals DS1~DS4 successively reach the high level H to start the successive reading of pixel signals Vo from the pixels D11, D12, D13 and D14.

As soon as the pixel-line selecting signal LS1 was changed to the low level, a next pixel-line selecting signal LS2 is changed to the high level H to select the second pixel line containing pixels D21, D22, D23 and D24. For a specified period T1 of the signal LS2 remaining at the high level, the pixel selecting signals DS1~DS4 successively reach the high level H to start the successive reading of pixel signals Vo from pixels D21, D22, D23 and D24.

Similarly, with the pixel-line selecting signals LS3 (LS4) changed to the high level H, the third (fourth) pixel line is selected and then, for a specified period T1 for which the signal LS3 (LS4) remains at the high level H, the pixel selecting signals DS1~DS4 successively reach the high level H to start the successive reading of pixel signals Vo from pixels D31, D32, D33 and D34 (D41, D42, D43 and D44).

When the pixel-line selecting signal LS1 was changed to the low level L after the period T1, the drain voltage VD2 for the pixels D11, D12, D13 and D14 in the first selected line is turned to the low level for a specified period T2 to make the pixels initialized and prepared for the next cycle of reading the pixel signals, which cycle will be performed with the elapse one cycle time T3.

When the pixel-line selecting signal LS2 was changed to the low level L after the period T1, the drain voltage VD1 for the pixels D21, D22, D23 and D24 in the second selected line is turned to the low level for the specified period T2 to initialize the pixels for the next sensor-signal reading cycle to be performed with the elapse one cycle time T3.

Similarly, once the pixel-line selecting signal LS3 (LS4) was changed to the low level L after the period T1, the drain voltage VD3 (VD4) for the pixels in the third (fourth) selected line is turned to the low level to initialize the pixels for the next sensor-signal reading cycle to be performed with the elapse one cycle time T3.

Although the drain voltage VDX (x=1~4) is turned to the low level L to initialize each pixel circuit with the pixel-line selecting signal LSX (X=1~4) decreased to the low level with the elapse time period T1, the initializing timing may be within the duration T4 for which the pixel line selection is paused with the pixel-line selecting signal LSX being at the Low level L.

The timing of occurrence of signals at respective portions is decided by driving the pixel-line selecting circuit 11, the pixel selecting circuit 12 and the voltage switching-over circuit 15 under the control from a control circuit (not shown).

Initializing each pixel at the timing adapted to scanning for reading each pixel signal may avoid an over or short charge accumulating duration for a whole system of the image sensor.

Thus, according to the present invention, it is possible to realize an image sensor having a wide dynamic range of its logarithmic output characteristic with no afterglow of any pixel.

A welding condition monitoring device according to the present invention uses the above-described image sensor for taking an image of a welding work portion, which is featured by the capability of enhancing image signals corresponding to the high luminance welding portion and low luminance bead portion and outputting enhanced signals so that the welding work portion and the bead portion may be clearly observed with a high contrast there between in a glare of light at the welding position.

Figure 12:
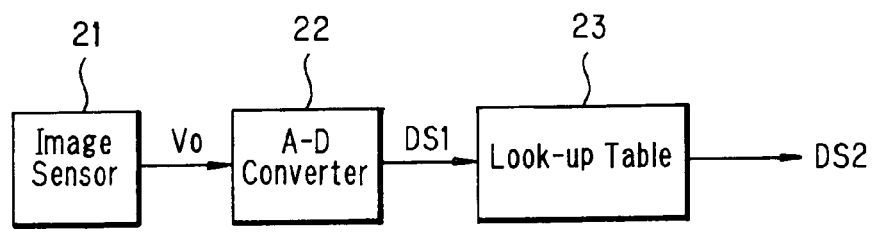
FIG. 12 is a block diagram showing an exemplary construction of an image processing portion for carrying out the conversion of an output of an image sensor according to the present invention.

FIG. 12 shows an exemplary construction of a welding condition monitoring system for selectively enhancing image signals of a high luminance welding portion and a low luminance bead portion by processing data of an image taken therefrom by an image sensor.

In this device, pixel signals (analog signals) Vo representing respective pixels composing an image taken by an image sensor 21 and output in time series are first converted into digitized signals DS1 which are then converted to digitized signals DS2 suitably selected from an output conversion table prepared in advance in a look-up table 23. The suitably selected digitized signals DS2 are output to compose a final output image signal of the image sensor.

Figure 13A:
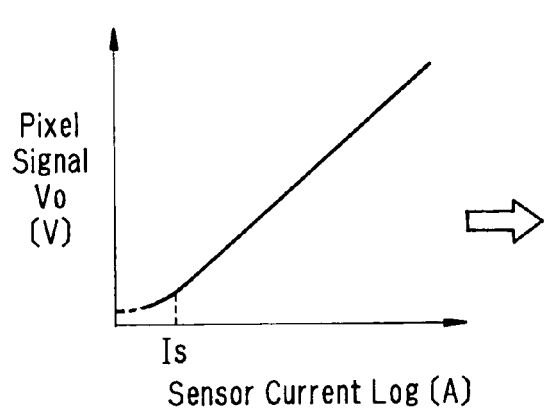
FIGS. 13(a) and 13(b) show an example of the conversion of an output characteristic in 13(a) of an image sensor of the present invention into a linear characteristic in 13(b) by using a look-up table.
Figure 13B:
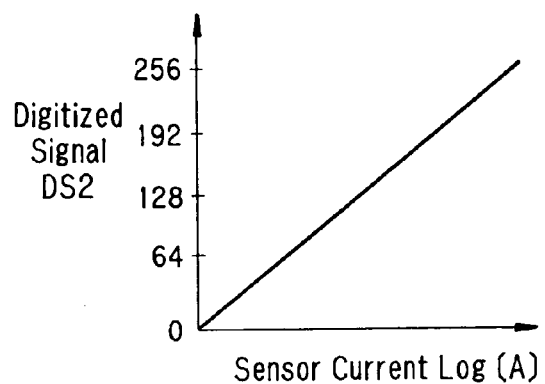

For example, pixel signals Vo output from an image sensor presenting a logarithmic output characteristic at a sensor current equal to or more than a specified value Is and a non-logarithmic output characteristic at a sensor current less than the value Is as shown in FIG. 13(a) are converted by an A-D converter 22 into digitized signals DS1 of 8 bits (256 gradations) as shown in FIG. 13(b) and the digitized signals DS1 are further converted by using the lookup table 23 to digitized signals DS2 which effectively use 256 gradations and presents a full logarithmic output characteristic.

The output signals DS2 thus converted ensure a sufficient dynamic range for luminosity and obtain 8-bit (256 gradations) image information which contains plenty of bright-and-dark information using a full 256 gradations.

However, the linear conversion of output signals as described above is still not enough to obtain a necessary contrast between the welding work portion and the bead portion in the image because the image sensor may respond to unwanted smoke lightened by plasma produced at the welding work portion irradiated by a laser beam.

Figure 14:
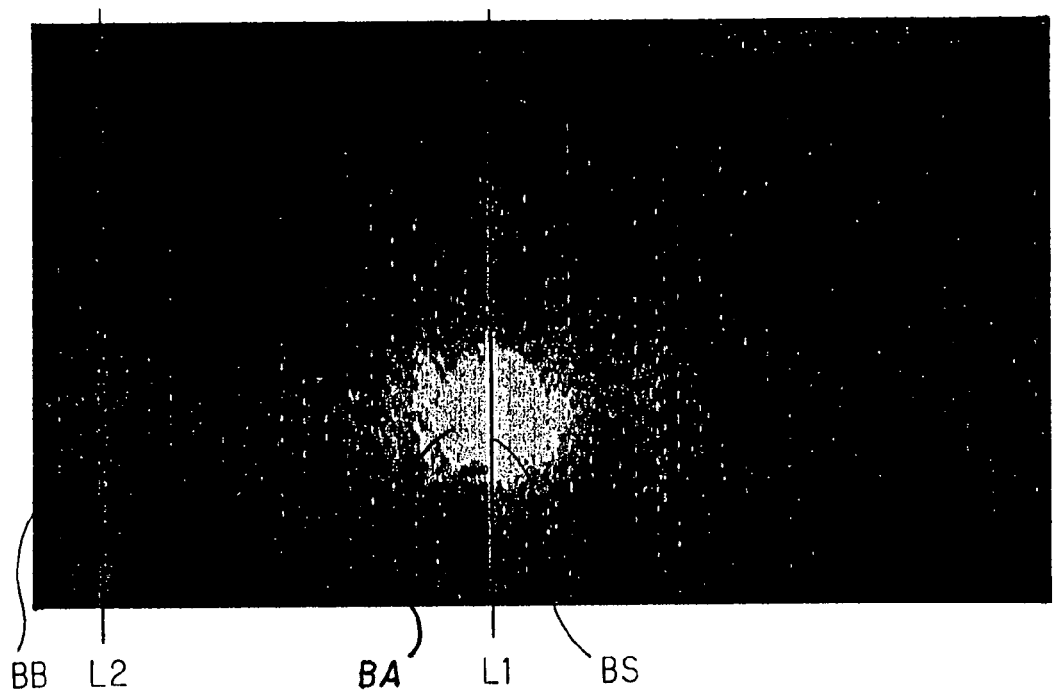
FIG. 14 shows an image of a welding work portion, which was presented by a digitized signal linearly converted.

FIG. 14 shows a state of an image of the welding work portion, which image was formed by linearly converted digitized signals DS2. In FIG. 14, there is shown a welding position (laser beam spot) BS, a molten pool BA and a bead portion BB. In the image in the shown condition, the bead portion BB cannot be discriminated, the welding position BS is also difficult to indicate its center and a molten pool BA is unclear in its shape.

Figure 15:
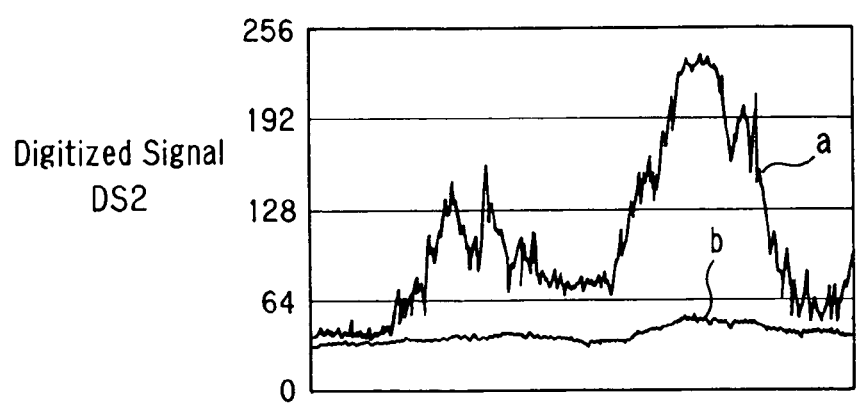
FIG. 15 shows characteristics of digitized signals from a welding work portion and a bead portion of a work being welded.

FIG. 15 shows a characteristic (a) of a digitized signal DS2 on a line L1 passing the welding position BS in the image of FIG. 14 and a characteristic (b) of a digitized signal DS2 on a line L2 passing the bead portion in the image of FIG. 14.

The present invention does not only attain a wide dynamic range covering a whole luminance range by using the look-up table 23 and obtain image information containing plenty of bright-and-dark information using a full 256 gradation levels but also does image processing for emphasizing image signals representing a high luminance welding portion and a low luminance bead portion respectively and omitting signals of other remaining areas by compression.

Figure 16:
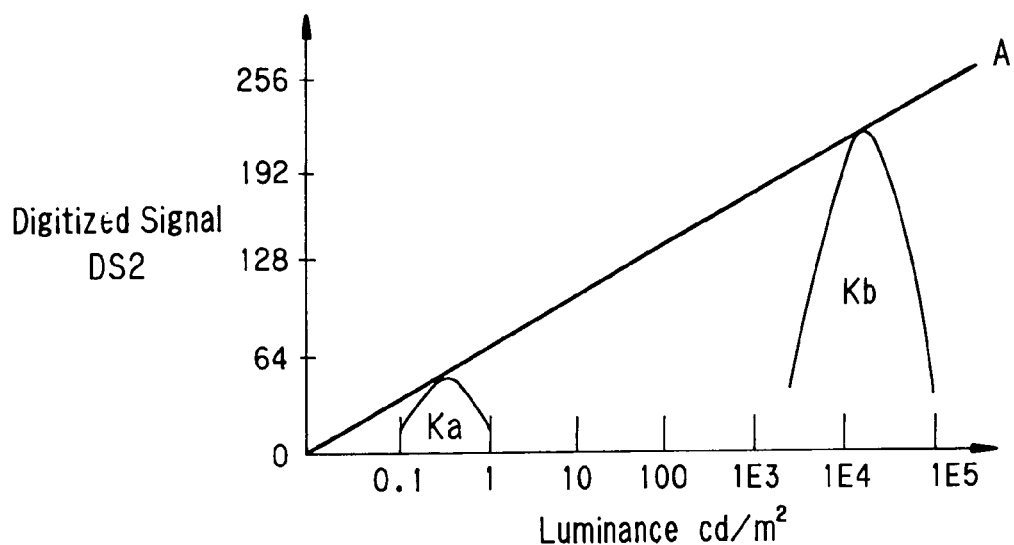
FIG. 16 shows distribution characteristics of luminance at a just formed bead portion and a currently welding portion versus the output characteristic of an image sensor.

FIG. 16 shows luminance distribution Ka in the image of a just formed bead portion and luminance distribution Kb in the image of a welding portion.

Figure 17:
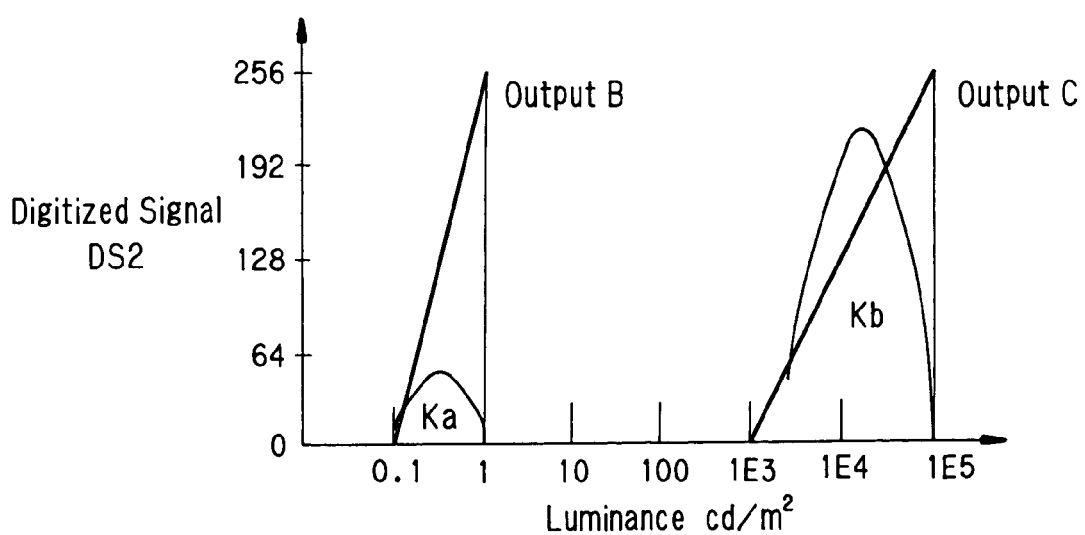
FIG. 17 shows an example of image sensor output characteristics converted in accordance with the luminance distribution.

In the case of monitoring the welding state of a welding work portion by an image taken therefrom by the image sensor 21, image component signals within the luminance distribution Ka are needed to observe the bead portion and image component signals within the luminance distribution Kb are needed to observe the welding portion. In other words, as seen from a conversion characteristic A of FIG. 16, if digitized signals DS2 output from the lookup table 23 were linearly converted, image information other than those of luminance distribution ranges Ka and Kb becomes unnecessary. Image information within the luminance distribution ranges Ka and Kb are obtained, as shown in FIG. 17, by converting information corresponding to the luminance distribution ranges Ka and Kb into information of conversion characteristics B and C respectively by using the lookup table 23.

The above described conversion of outputs of the image sensor enables the monitoring system to obtain the digitized signals DS2 to present an image in which only the welding portion and the bead portion are emphasized with an increased contrast. If the signals DS2 are each of 8 bits, they can also be rich with bright-and-dark information using a full 256 gradation levels.

The converted characteristics B and C of outputs of the image sensor 21 may be treated as those of the same image. They may be also treated as respective images, i.e., an output image of converted characteristic B only and an output image of converted characteristic C only. Namely, an image of the just formed bead portion only can be obtained by using the output of converted characteristic B and an image of the welding portion only can be obtained by using the output of the converted characteristic C.

Figure 18:
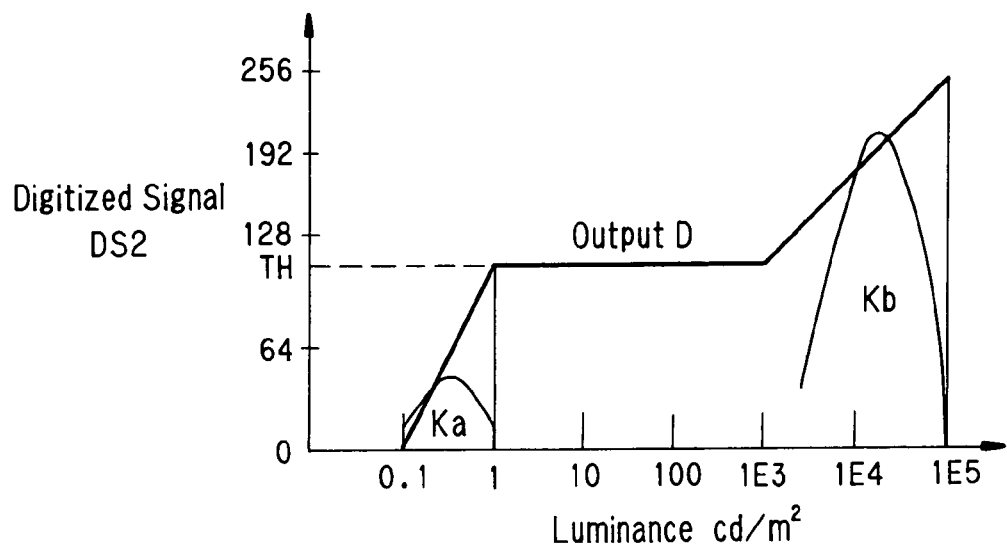
FIG. 18 shows another example of image sensor output characteristics converted in accordance with the luminance distribution.

FIG. 18 shows another example of conversion of output characteristic of the image sensor 21 according to the look-up table 23. In this instance, the outputs of the image sensor 21 within the intermediate range between the luminance distribution Ka and the luminance distribution Kb is converted to that of a converted characteristic D fixed to a threshold TH.

Figure 19:
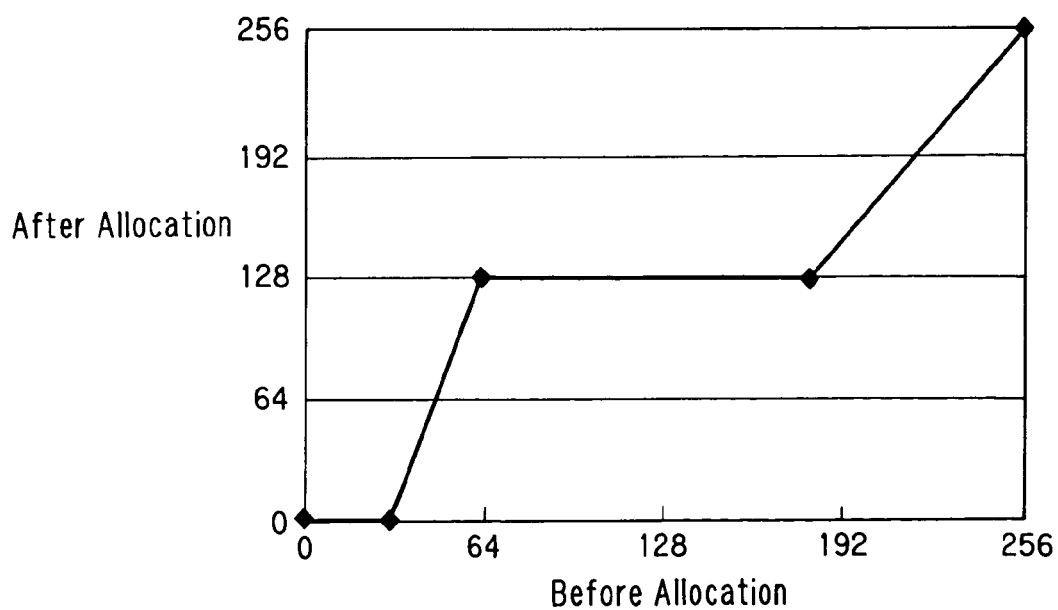
FIG. 19 shows the conversion of linearly converted digitized signals by allocating 256 graduations thereto.

In practice, the digitized signals each of 8 bits as shown in FIG. 13(b), which were linearly converted to those exhibiting a logarithmic output characteristic over a whole luminance range, are given allotments of 256 bits in a relationship as shown in FIG. 19.

The image sensor 21 having the converted output characteristics can provide an image wherein a just formed bead portion of relatively low luminance and a welding portion of high luminance are highly contrasted from each other and further distinctly bounded by the intermediate areas having the luminance fixed to the threshold value TH.

Figure 20:
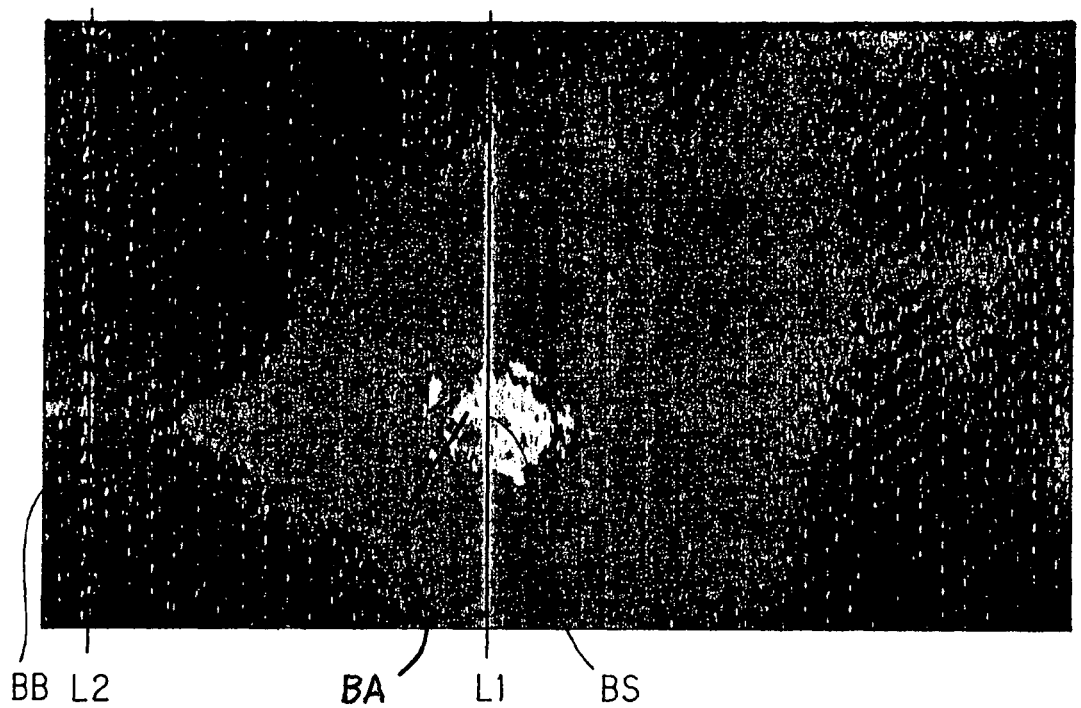
FIG. 20 shows an image of a welding work portion based on the digitized signals having the linearly converted characteristic of FIG. 17.

FIG. 20 shows a state of an image of a welding work portion, which is composed of digitized signals DS2 having the converted characteristic D. In FIG. 20, there is shown a welding position BS currently irradiated by a laser beam, a molten pool BA and a bead portion BB. The image allows an observer to clearly recognize a center position of the currently welding position BS and a shape of the molten pool and reliably discriminate the bead portion.

Figure 21:
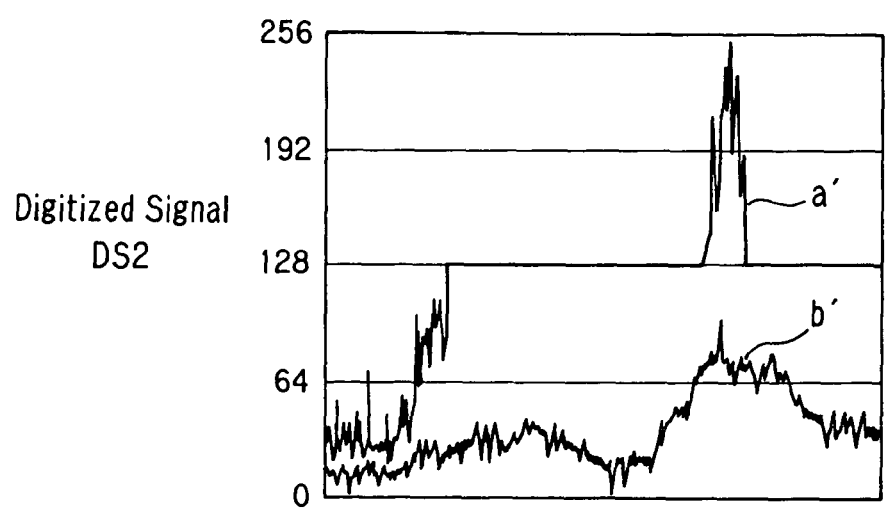
FIG. 21 shows characteristics of digitized signals relating to the welding portion and the bead portion, respectively, of the image of FIG. 20.

FIG. 21 shows a characteristic (a') of a digitized signal DS2 on a line L1 passing a welding position BS in the image of FIG. 20 and a characteristic (b') of a digitized signal DS2 on a line L2 passing a bead portion in the image of FIG. 20.

In converting the output characteristic of the image sensor 21, a range of outputs to be emphasized with an increased contrast can be suitably shifted by using a ND filter and a diaphragm.

The welding condition monitoring device according to the present invention can be applied widely to various kinds of welding machines such as for example a laser welder, arc welder, gas welder, thermit welder, electron beam welder and electro slag welder.

Figure 22:
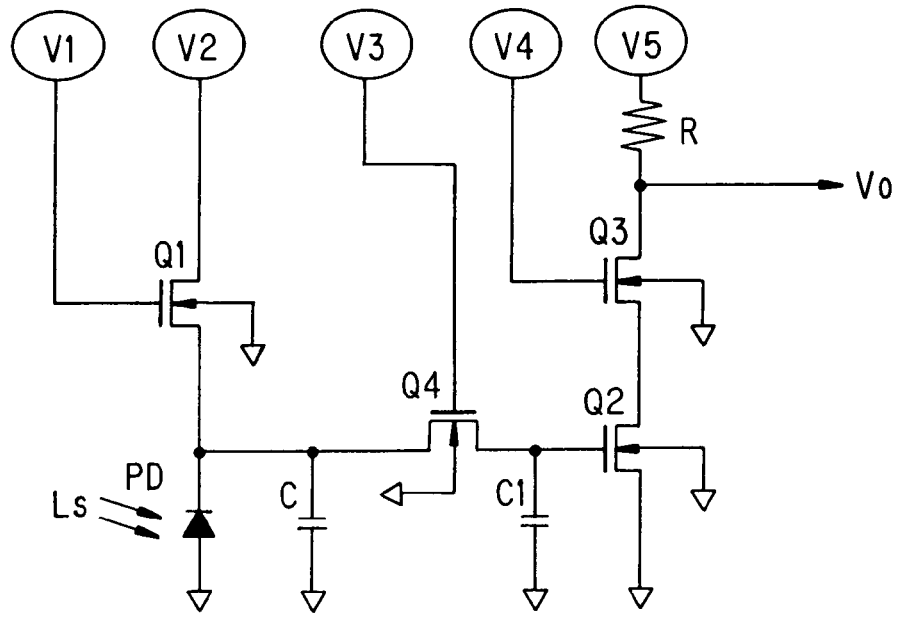
FIG. 22 shows another exemplary circuit diagram of a light sensor circuit.
Figure 24:
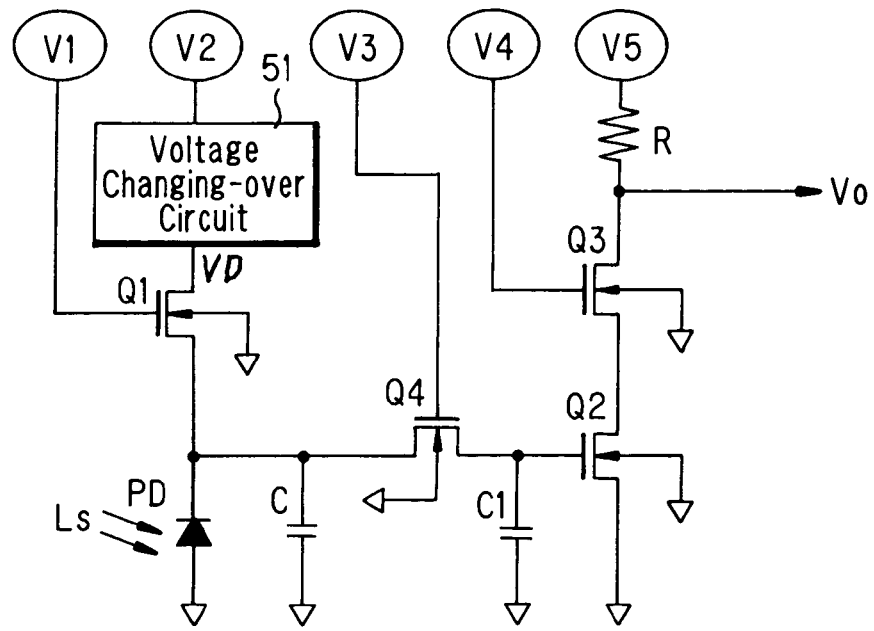
FIG. 24 shows another exemplary circuit diagram of a light sensor circuit.
Figure 26:
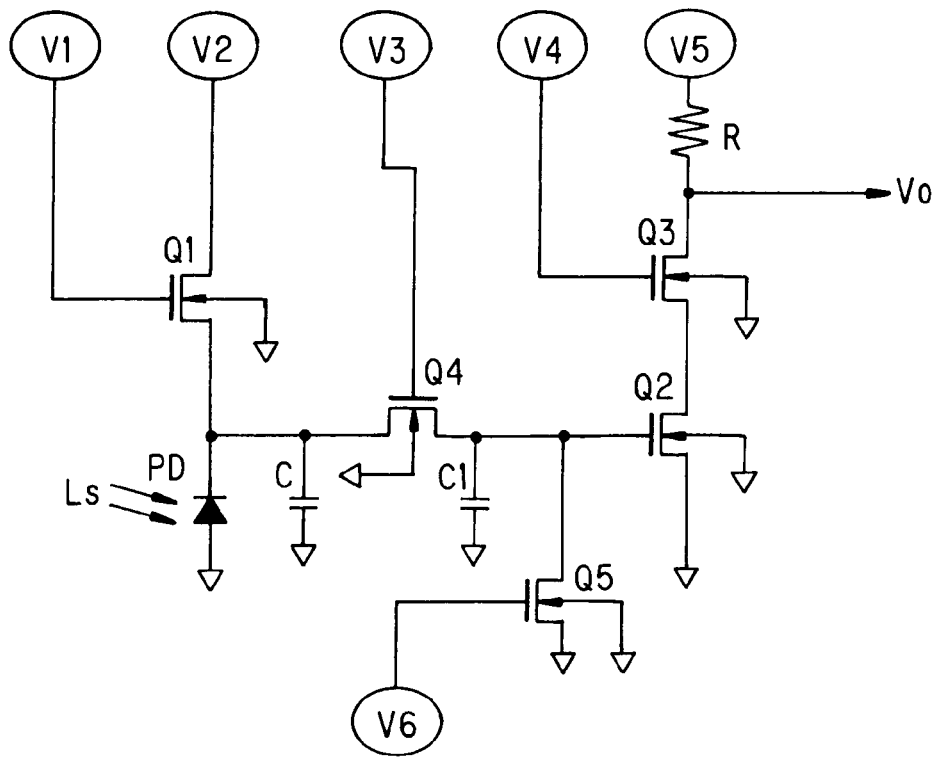
FIG. 26 shows another exemplary circuit diagram of a light sensor circuit.

Light sensor circuits composing an image sensor used in the welding condition monitoring device are not limited to the type shown in FIG. 2 and may be also of the types shown in FIGS. 22, 24 and 26.

The light sensor circuit shown in FIG. 22 as compared with that shown in FIG. 2 is featured by the provision of a shutter function (sample and fold function) which is realized by a capacitor C1 for accumulating a terminal voltage Vpd of a photodiode PD as a pixel signal and a MOS transistor Q4 for transferring an electric charge in a parasitic capacitor C of the photo diode PD to the capacitor C1.

In the above-described light sensor circuit, a driving control signal is given to open or close the shutter to obtain an output pixel signal in accordance with the open time of the shutter.

Namely, once a driving voltage V1 is turned to the high level at timing t1~t2, then transistor Q1 is turned ON to inject an electric charge into the parasitic capacitor C of the photodiode PD. The electric charge in the parasitic capacitor C of the photodiode PD is then discharged at timing t2~t3 by an amount proportional to a sensor current flowing in the photodiode PD when light falls on the photodiode PD.

Before the period of timing t2~t3 (shutter being open), a transistor Q4 is also kept in ON state and the terminal voltage Vc of the parasitic capacitor C and the terminal voltage Vc1 of the capacitor C1 are equal to each other.

When the transistor Q4 is turned OFF at timing t3, then the terminal voltage Vc1 of the capacitor C1 is held.

When the transistor Q4 turned ON at timing t4~t5, then the pixel signal Vo is output via resistance R.

Figure 23:
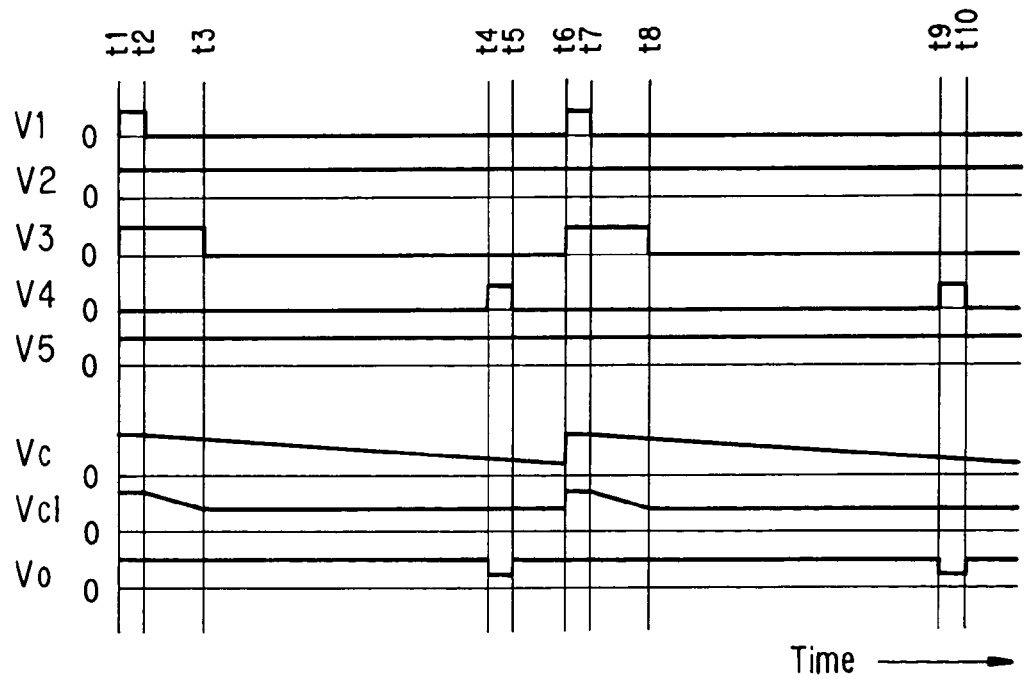
FIG. 23 is a time chart of control signals generated by respective portions of the light sensor circuit of FIG. 22.

In this light sensor circuit, turning-off of the transistor Q4 at timing t3 and thereafter causes the capacitor C1 to hold the electric charge at a constant level until the transistor Q4 is turned ON and the electric charge in the parasitic capacitor C is transferred to the capacitor C1. This means that the same pixel signal Vo is output irrespective of a change in terminal voltage Vc of the parasitic capacitor C while the transistor Q4 is kept in OFF state (the holding time of the capacitor C1). Therefore, the pixel signal having excellent reproducibility can be output by driving the light sensor circuit shown in FIG. 22 at timing shown in FIG. 23.

Figure 25:
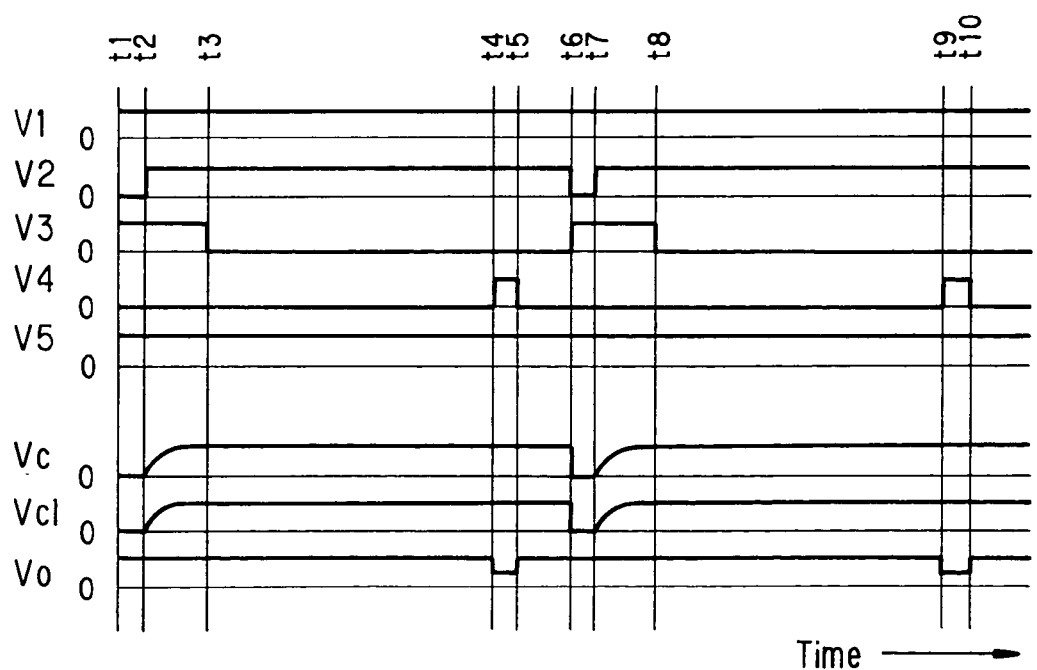
FIG. 25 is a time chart of control signals generated by respective portions of the light sensor circuit of FIG. 24.

The light sensor circuit shown in FIG. 24 differs from the light sensor circuit of FIG. 22 by the provision of a voltage changing-over circuit 51 for initializing the circuit by removing a remaining charge in the parasitic capacitor C of the photodiode PD by decreasing the drain voltage VD of the transistor Q1. This can prevent the occurrence of afterglow of the pixel at a small quantity Ls of light falling on the photodiode PD. FIG. 25 shows a time chart of control signals for respective portions of the light sensor circuit of FIG. 24.

FIG. 26 shows another exemplary construction of a light sensor circuit having a shutter function, which is provided with a transistor Q5 for charging and discharging a capacitor C1. The electric charge of the capacitor C1 is discharged by the transistor Q5 so that the charge in a parasitic capacitor C may be transferred with excellent reproducibility to the capacitor C1.

Figure 27:
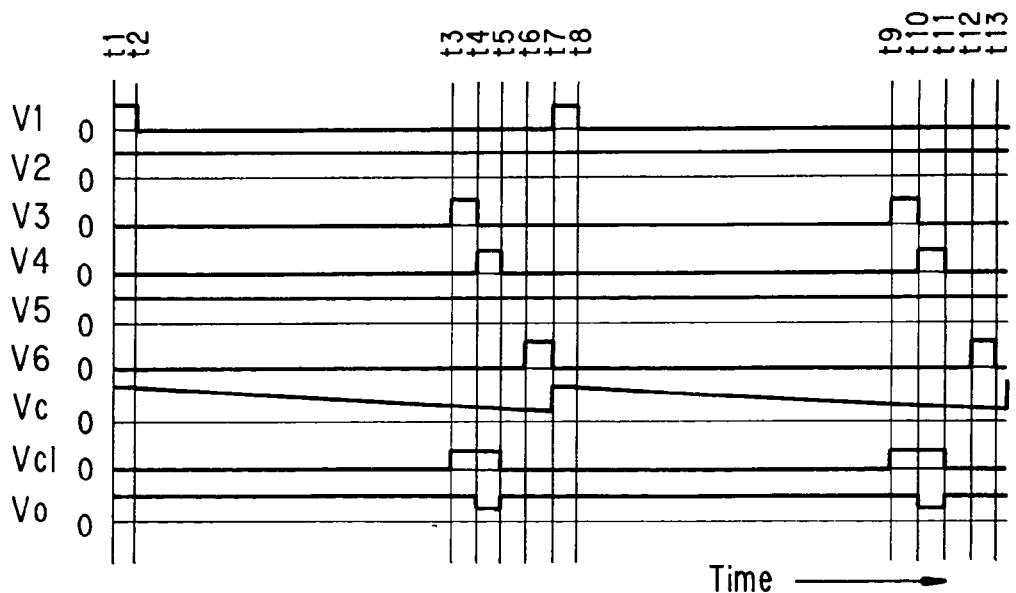
FIG. 27 is a time chart of control signals generated by respective portions of the light sensor circuit of FIG. 26.

The operation of this light sensor circuit is similar to that of the light sensor circuit of FIG. 22 and differs only by the fact that the transistor Q5 is turned ON at timing t6~t7 as shown in FIG. 27 to discharge the capacitor C1 and thereby initialize the pixel signal.

Figure 29:
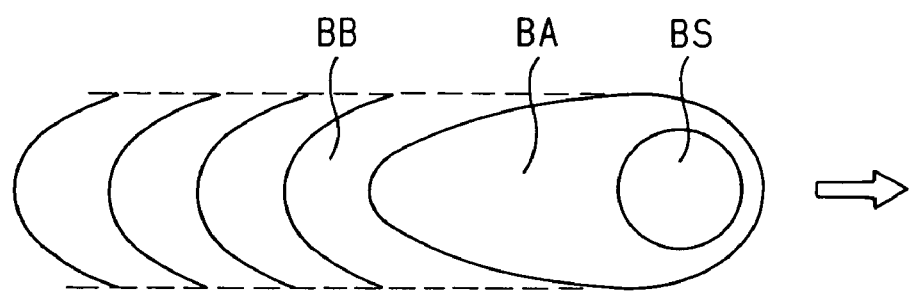
FIG. 29 illustrates a state of welding portion of a surface of metals being joined together by laser welding.

A welding condition monitoring device according to the present invention uses a CMOS type camera 2 having a logarithmic output characteristic with a wide dynamic range as described above, which camera is attached to a welding head 1 of a laser welding machine to take a whole image of a molten pool BA and a bead portion BB in a welding work portion, as shown in FIG. 29.

This device is capable of taking an image showing the state of the welding work portion, which image can clearly present a whole welding work portion covering a high-temperature and high-luminance molten pool BA of metal fused by heat of a laser beam and a relatively low temperature bead portion BB formed by solidification of weld metal with no halation and no darkness therein.

Figure 30:
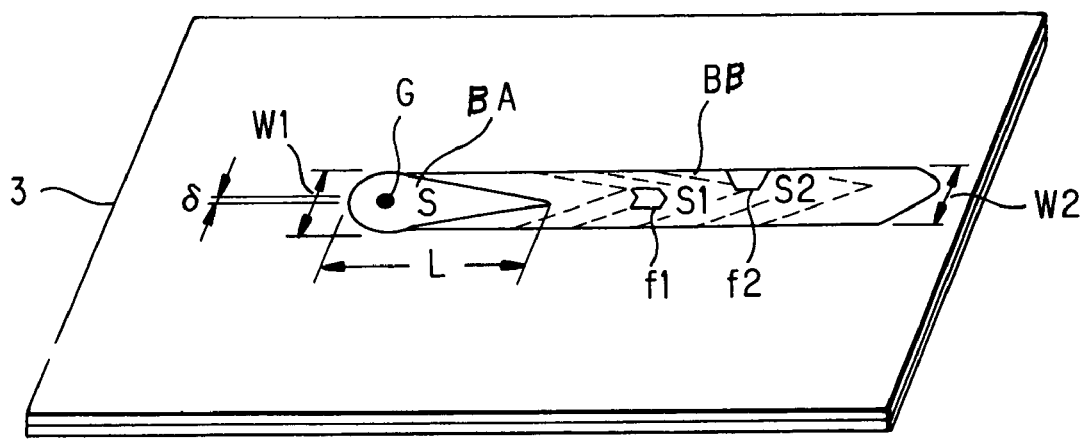
FIG. 30 shows an exemplary condition of an image of a welding portion of metals being welded together by laser welding, which is taken by a CMOS type camera.

FIG. 30 shows an exemplary image of a welding work portion, which was taken by the CMOS type camera 2 described above.

Figure 31:
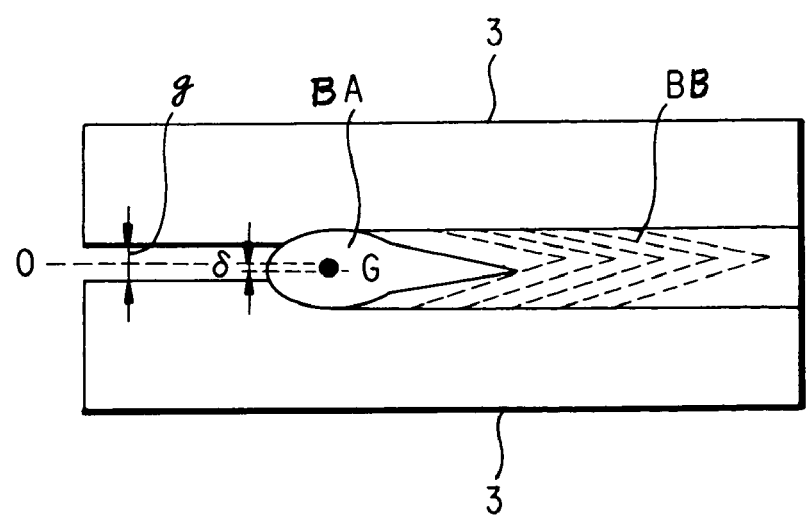
FIG. 31 illustrates a displacement of a welding position in case of butt welding.
Figure 32:
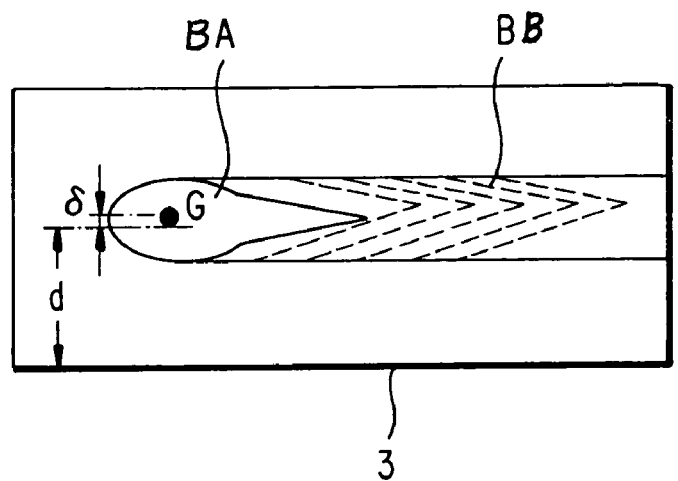
FIG. 32 illustrates a displacement of a welding position in case of lap welding.

In this case, the image processing device 4 reads data from the image taken by the CMOS type camera 2 and, based on the obtained data, reliably determines a center position G, area S, length L and width W1 of a laser beam spot on the molten pool BA as well as a width W2 of the bead portion BB, the number of surface defects f1, f2 and defect areas S1, S2 of the surface defects of the bead portion BB. The welding condition can be judged based on the determined data. The judgment result data is fed to the electronic control unit (ECU) 6 (FIG. 1) which changeably regulates the welding conditions in accord with the judgment result. In practice, for example, a displacement δ of the welding point with respect to the members 3 being welded together is corrected by adjusting the position of the welding head under the control of the ECU 6. In the case of butt welding as shown in FIG. 31, the displacement δ of the welding position is determined as a displacement of a center position G in the molten pool BA from a center line O between butted plates. In the case of lap welding as shown in FIG. 32, the displacement δ is determined as a displacement of the center position G in the molten pool from a position d at a specified distance from the edge of the members 3 being welded together.

The surface area S of the molten pool BA is compared to a target value and the width W2 of the bead portion BB is compared to a target value and the welding condition is judged by examining whether differences between the measured values and the target values are allowable or not. In this instance, besides the size (surface area S), the length L and the width W of the molten pool BA are also compared with the respective target values to improve the accuracy of judgment on the welding condition.

The spot size of a laser beam irradiating the welding position of the members 3 being welded is adjusted by suitably adjusting the level of the welding head or the level of the members and the intensity of the laser beam for attaining the target width W2 of the bead portion BB on the weld product 3. The rate of feeding the members 3 being welded together is also adjusted to prevent the occurrence of surface defect of the bead formed thereon.

The welding conditions are examined and changeably controlled based on the examination results in real time during the operation of the welding machine.

As shown in FIG. 1, a CMOS camera 2 is attached integrally to the outside of the welding head 1 by a supporting member 9 provided with a mechanism for adjusting the position thereof.

In the teaching stage, the CMOS type camera 2 attached to the welding head 1 is placed in a position best suited to take a whole image covering both a molten pool BA and a bead portion BB by using the position adjusting mechanism of the supporting member 9 and by observing a view shown by the camera.

Figure 33:
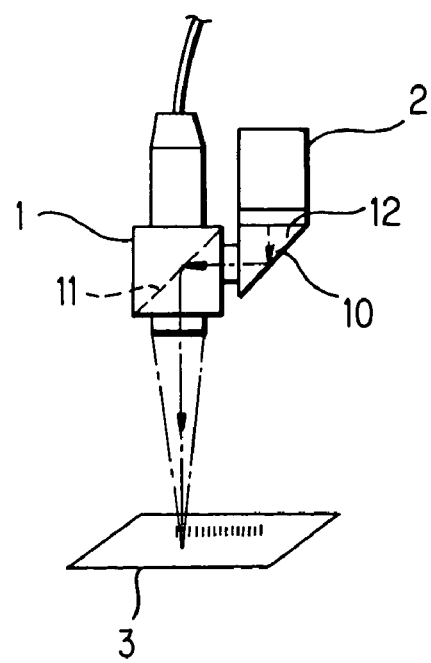
FIG. 33 is a schematic partial view of a welding machine having a welding head with a CMOS camera attached thereto.
Figure 34:
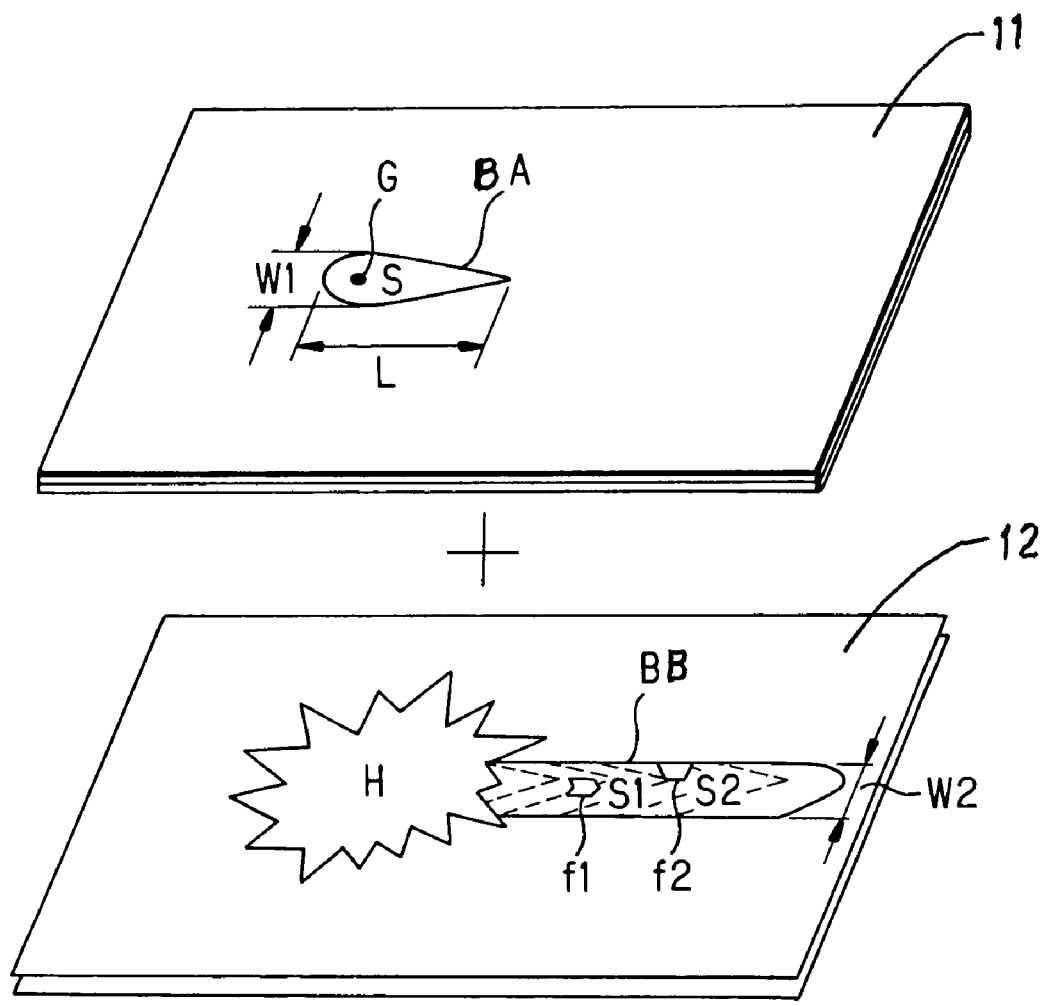
FIG. 34 is a combination of two images of a molten pool area and a bead area, which were separately taken by 2 sets of CCD cameras.

FIG. 33 shows another exemplary construction for attaching a CMOS type camera 2 to a welding head 1. In the shown example, the CMOS type camera 2 is attached to a base 12 of the welding head 1 so that it may take an image of a welding work portion through an inside light path of the welding head 1 and an optical system (reflecting mirrors 10, 11). In this instance, since a spot of a laser beam from the welding head 1 can be always located at a center of an image taken by the CMOS camera 2, this camera can be easily mounted on the base 12 of the welding head 2 with no need for additionally positioning the camera 2.

The welding condition monitoring device according to the present invention can be also applied to, besides the above described laser welding, the case of distant one-sided welding of a butt or lap joint of members by an electric arc or an electron beam.

In this instance, the image processing device 1 determines, for example, a displacement of the welding position based on data of an image taken by the CMOS camera 2 and causes the ECU 6 to control a driving mechanism 8 of a robot to compensate for the displacement by suitably adjusting the position of the welding head 1. In practice, as shown in FIG. 31, a displacement δ of the center position G of the molten pool BA from a center axis 0 of a gap between butted members 3 being welded together is determined and the welding head 1 is moved to a position in which the value δ becomes equal to zero.

In this case, if the gap g of the butted members 3, which was determined by processing the data of an image taken by the CMOS camera 2, exceeds a specified value allowable for the combination of butted members 3, then the welding process is stopped under the control of the ECU 6.

The ECU 6 holds in memory the measured value of a gap g between the butted members, which value will be displayed on a display 5 after forcibly stopping the welding operation by the operator's instruction.

As shown for example in FIG. 32, a displacement δ of a center position G of a molten pool BA from a point at a specified distanced from the edge of the lapped members 3 being lap welded is determined and a welding head 1 is moved until the displacement value δ becomes equal to zero. The displacement δ of the welding position can be corrected, of course, by moving the butted or lapped members 3 instead of moving the welding head 1 by using the robot driving device 8. In this case, the ECU 6 controls the driving mechanism for transferring the members 3 on a plane.

Figure 35:
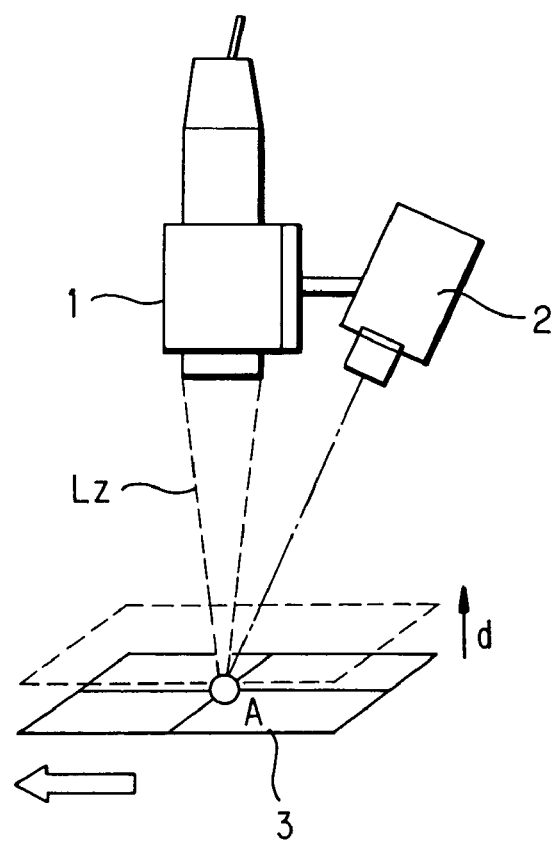
FIG. 35 shows relative positions of a welding head with a CMOS camera attached thereto and members to be welded.
Figure 36:
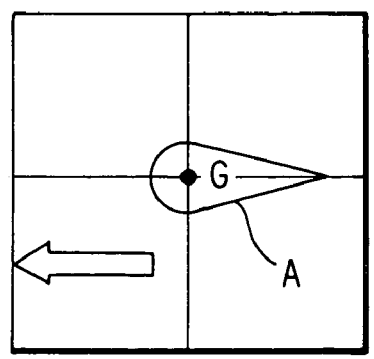
FIG. 36 shows a position of a molten pool on an image taken by CMOS camera when members being welded are placed on a reference plane.

As shown in FIG. 35, the welding condition monitoring device according to the present invention takes an image of a welding work portion of members 3 being welded together by a CMOS camera which is attached to a welding head 1 and directed at a slant (angle) to the welding position. During the welding operation under the control of the ECU 6, the level of the welding head 1 relative to the members 3 being welded together is adjusted so as to maintain the centre G of a laser beam spot Lz in the molten pool BA (i.e., a bright spot of a portion irradiated by a laser beam Lz) at a specified position, e.g., a centre on an image taken by the CMOS type camera 2 as shown in FIG. 36.

Figure 37:
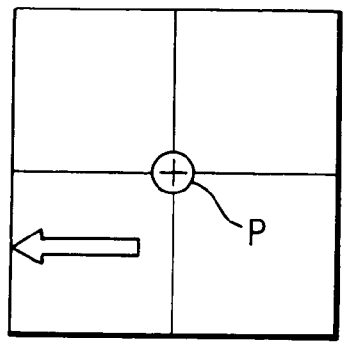
FIG. 37 shows a position of a bright spot on an image taken by a CMOS type camera when members to be welded are placed on a reference plane for teaching.

For this purpose, when teaching the welding machine with the monitoring device before actual welding operation, the welding head 1 is positioned relative to the members 3 to be joined together in such a manner that the bright spot P of a weak laser beam (with decreased intensity for the teaching operation) irradiating a welding starting point on the members 3 can be seen at a specified position on an image taken by the camera as shown in FIG. 37.

In this instance, the CMOS type camera 2 is positioned in advance in such a way that the bright spot P is brought to a specified position on the image taken by the camera 2 when the welding head 1 is located at a reference distance from the members 3 to be welded.

Figure 38:
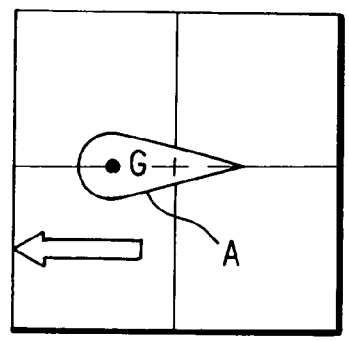
FIG. 38 shows a position of a molten pool on an image taken by a CMOS camera when the members were shifted upward from the reference plane.
Figure 39:
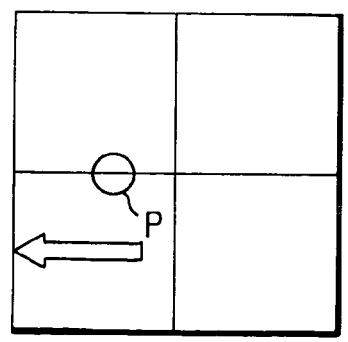
FIG. 39 shows a position of a bright spot on an image taken by a CMOS camera for teaching when members to be welded are shifted upward from the reference plane.

FIGS. 38 and 39 show images taken by the CMOS type camera when a work 3 was displaced upward from a reference plane by a specified distance d, wherein a laser beam spot center G in a molten pool on a members 3 being welded (in the case of FIG. 38) and a bright spot P on the members 3 in the teaching stage (in the case of FIG. 39) are displaced in the direction shown by an arrow by a specified distance from the reference position in the accordance with the displacement d of the members 3. In the case of FIG. 38, the ECU 6 causes the driving mechanism 8 of the robot to adjust the level of the welding head 1 so as to bring the laser beam spot center G in the molten pool BA on the members 3 to the specified position on the image taken by the CMOS camera 2. Similarly, in the case of FIG. 39, the level of the welding head 1 in the teaching stage is adjusted so as to put the bright spot P on the members 3 in the specified position on the image taken by the camera 2. It is of course possible to easily attain the correct relative arrangement of the welding head 1 and the members 3 being welded or to be welded by adjusting the transferring base (not shown) of the members 3 in an upward or downward direction under the control of the ECU 6.

Since the CMOS type camera possesses a wide dynamic range of its logarithmic output characteristic, it can take a clear image of the work 3 being welded or to be welded, wherein a high luminance portion of the molten pool BA formed in the welding process is clearly shown with no halation or relatively low luminance bright spot P used in the teaching stage is also distinctly shown in detail with no invisible blackness. Therefore, it is possible to accurately adjust the welding head 1 and maintain it at a constant distance from the members 3 being welded with the laser beam by monitoring a view provided by the camera.

As is apparent from the foregoing, a welding condition monitoring device according to the present invention uses an image sensor having a wide dynamic range enough to take an image covering a high-luminance welding portion and a low-luminance bead portion of members being welded and has a means for emphasizing outputs of an image sensor in any of luminance ranges by using a output characteristic conversion table for the image sensor and can thereby provide the image clearly showing the currently welding position and the bead portion with a sufficient contrast in a glare of a laser beam.

The image thus processed allows one to easily recognize a very bright welding portion and a relatively dark already formed bead portion of the members being welded and reliably estimate the quality of a weld joint to be produced.

A welding condition monitoring device according to another aspect of the present invention uses a single CMOS type camera having a wide dynamic range, which is integrally attached to a welding head and is capable of taking a clear image of a welding portion covering a very bright molten pool with no halation and a relatively dark bead portion with no invisible blackness.

The CMOS type camera can be easily mounted in a specified position on the welding head and can provide a clear single image of a whole welding portion covering a high-luminance molten pool and a low-luminance bead portion. The welding conditions can be easily examined by processing data of the image and can be suitably changed based on the examination result.

A welding condition monitoring device according to another aspect of the present invention is capable of monitoring the welding state by taking an image of the welding work portion covering a high-luminance molten pool and a low-luminance bead portion by using a single CMOS type camera having a wide dynamic range enough to clearly present the very bright welding portion with no halation and the relatively dark bead portion with no invisibly darkened part and is also capable of reading and processing data from the input image and estimating the welding condition of the welding work portion by using an image processing means, enabling the welding machine to suitably change the working parameters based on the estimation results.

A welding condition monitoring device according to another aspect of the present invention is capable of monitoring the welding state of welding work portion by taking an image of the welding portion covering a bright molten pool and a relatively dark bead portion by using a single CMOS type camera having a wide dynamic range enough to clearly present the bright portion with no halation and the relatively dark portion with no invisibly darkened part and is also capable of determining a displacement of the welding position from the reference point on an image currently displayed on the monitor screen by using a image processing means and reliably correcting the welding position by using a welding position correcting means based on the determined displacement value.

A welding condition monitoring device according to another aspect of the present invention is capable of monitoring the welding state of a welding work portion by taking an image showing a bright molten pool and a relatively dark bead portion by using a single CMOS type camera having a wide dynamic range enough to clearly present the bright portion with no halation and the dark portion with no invisibly darkened part, which camera is attached to a distant laser welding head to take in slanting direction a view of members being welded and is also capable of adjusting the level of the welding head with respect to the members being welded by using a height adjusting means so as to put a bright spot of the welding portion in a specified position on a view seen by the camera. This device can provide an image clearly showing a high-luminance position during the welding process and a low-luminance bead portion during the teaching stage of the welding machine and can achieve the correct control of the position of the welding head so as to always maintain a specified distance from the members being welded based on the clear view of the bright spot on the welding portion. This assures an improved quality of the weld produced by the welding machine.

The invention claimed is:

1. A welding condition monitoring device for monitoring a welding state of a welding work portion by taking an image thereof by an image sensor, which device has a means for selectively emphasizing outputs of the image sensor for any of luminance areas of the image by using an output-characteristic conversion table for the image sensor, whereby outputs relating to a high luminance welding portion and outputs relating to a low luminance bead portion area are emphasized respectively to increase a contrast between the currently welding portion and the already formed bead portion in the image, and outputs relating to an area between the high luminance welding portion and the low luminance bead portion area is fixed to a constant level, and signals of other remaining areas are omitted by compression, and wherein each of plural light sensor circuits composing the image sensor represents a unit pixel and has a logarithmic output characteristic, and each of the light sensor circuits composing the image sensor represents a unit pixel and comprises a MOS transistor capable of converting a current flowing in a photodiode into a voltage signal with a logarithmic output characteristic in a weak inverse state.

2. A welding condition monitoring device as defined in claim 1, wherein each of the light sensor circuits composing the image sensor represents a unit pixel and uses a MOS transistor capable of converting a current flowing in a photodiode into a voltage signal with a logarithmic output characteristic in a weak inverse state and has an initializing means for removing a charge remaining in a parasitic capacitor of the photodiode by changing a drain voltage of the MOS transistor.

3. A welding condition monitoring device as defined in claim 1, wherein each of the light sensor circuits composing the image sensor represents a unit pixel and has a shutter function.

4. A welding condition monitoring device as defined in claim 1, wherein the image sensor is attached integrally to a welding head for taking a single image showing therein both a molten pool and a bead portion of the welding work portion.

5. A welding condition monitoring device as defined in claim 4, wherein the image sensor is attached by a supporting member to an outside of the welding head for directly taking an image of a molten pool and a bead portion of the welding work portion.

6. A welding condition monitoring device as defined in claim 5, wherein the supporting member is provided with a position adjusting mechanism for adjusting a working position of the image sensor.

7. A welding condition monitoring device as defined in claim 4, wherein the image sensor attached to the welding head takes an image of the welding work portion through an optical system including an optical path inside the welding head.

8. A welding condition monitoring device as defined in claim 1, wherein the image sensor is for taking a single image showing both a molten pool and a bead portion of the welding work portion and an image processing means is provided for reading data of the image and judging the welding condition.

9. A welding condition monitoring device as defined in claim 8, wherein the welding condition is judged by determining a surface area of the molten pool, a width of the bead and the number of surface defects and an area of the defects from data of the image taken by the image sensor.

10. A welding condition monitoring device as defined in claim 8, wherein the welding condition is judged by further determining a length and a width of the molten pool.

11. A welding condition monitoring device as defined in claim 8, which is provided with a control means for changeably controlling variables of welding conditions based on a result of the judgment on the welding condition.

12. A welding condition monitoring device as defined in claim 1, which uses the image sensor for taking a single image showing both a molten pool and a bead portion of the welding work portion and has an image processing means for determining a displacement of a welding position based on data of the image taken by the image sensor and a position correcting means for correcting for the determined displacement of the welding position.

13. A welding condition monitoring device as defined in claim 12, wherein a displacement of a center axis of a gap between members being joined together by butt welding from a center position of a molten pool is determined from data of an image taken by the image sensor during the butt welding process and a welding head or the members being butt welded are moved until the determined displacement becomes zero.

14. A welding condition monitoring device as defined in claim 12, wherein a control means is provided for determining a value of a gap between members being joined together by butt welding from data of the image taken by the image sensor and stopping the welding operation if the determined gap value exceeds a specified value.

15. A welding condition monitoring device as defined in claim 12, wherein a displacement of a center position of a molten pool from a reference line parallel to and apart by a specified distance from an edge of lapped members being joined together by lap welding is determined from data of the image taken by the image sensor during the lap welding process and a welding head or the members being welded are moved until the determined displacement becomes zero.

16. A welding condition monitoring device as defined in claim 1, wherein the image sensor has a logarithmic output characteristic and is attached to a distant welding head for welding members with no contact thereto and set in a position for shooting at an angle a bright spot irradiating a welding position of members to be welded, and a means is provided for adjusting a level of the welding head with respect to the members in such a manner that the bright spot is placed at a specified position on an image taken by the image sensor.

17. A welding condition monitoring device as defined in claim 16, wherein the welding head and the members to be welded by the welding head are positioned relative to each other in a teaching stage before welding operation in such a manner that a bright spot irradiating a welding start point on the members is set at a specified position on an image taken by the image sensor.

18. A welding condition monitoring device as defined in any one of claims 4, 8 and 12, wherein the image sensor has a logarithmic output characteristic.

19. A welding condition monitoring device as defined in claim 18, wherein the image sensor is composed of a number of light sensor circuits each of which represents a unit pixel and has an initializing means for removing an electric charge remaining in a parasitic capacitor of a photodiode by changing a drain voltage of a MOS transistor for converting a sensor current flowing from the photodiode into a voltage signal with a logarithmic characteristic in inverse weak state.

20. A welding condition monitoring device as defined in claim 19, wherein each of the light sensor circuits has a shutter function.

21. A welding condition monitoring device as defined in claim 16, wherein the image sensor is composed of a number of light sensor circuits each of which represents a unit pixel and has an initializing means for removing an electric charge remaining in a parasitic capacitor of a photodiode by changing a drain voltage of a MOS transistor for converting a sensor current flowing for the photodiode into a voltage signal with a logarithmic characteristic in inverse weak state.

22. A welding condition monitoring device as defined in claim 21, wherein each of the light sensor circuits has a shutter function.

23. A method for monitoring a welding state of a welding work portion, comprising the steps of taking an image of the welding work portion by an image sensor, selectively emphasizing outputs of the image sensor for any of luminance areas of the image by using an output-characteristic conversion table for the image sensor, whereby outputs relating to a high luminance welding portion and outputs relating to a low luminance bead portion are emphasized, respectively, to increase a contrast between the currently welding portion and the already formed bead portion in the image, and fixing the outputs relating to an area between the high luminance welding portion and the low luminance bead portion area to a constant level.

24. A method as defined in claim 23, comprising the step of using a plurality of light sensor circuits as the image sensor, and each light sensor circuit represents a unit pixel and has a logarithmic output characteristic.

25. A method as defined in claim 24, wherein each of the light sensor circuits comprises a MOS transistor capable of converting a current flowing in a photodiode into a voltage signal with a logarithmic output characteristic in a weak inverse state.

26. A method as defined in claim 25, wherein each of the light sensor circuits has an initializing means for removing a charge remaining in a parasitic capacitor of the photodiode by changing a drain voltage of the MOS transistor.

27. A method as defined in claim 24, wherein each of the light sensor circuits has a shutter function.

28. A method as defined in claim 23, wherein the image sensor is attached integrally to a welding head for taking a single image showing therein both a molten pool and a bead portion of the welding work portion.

29. A method as defined in claim 28, wherein the image sensor is positioned outside of the welding head for directly taking an image of a molten pool and a bead portion of the welding work portion.

30. A method as defined in claim 29, wherein the working position of the image sensor is adjustable.

31. A method as defined in claim 28, wherein the image sensor takes an image of the welding work portion through an optical system including an optical path inside the welding head.

32. A method as defined in claim 23, comprising the steps of using the image sensor for taking a single image showing both a molten pool and a bead portion of the welding work portion, and processing the image by reading data of the image and judging the welding condition.

33. A method as defined in claim 32, wherein the welding condition is judged by determining a surface area of the molten pool, a width of the bead, the number of surface defects, and an area of the defects from data of the image taken by the image sensor.

34. A method as defined in claim 32, wherein the welding condition is judged by further determining a length and a width of the molten pool.

35. A method as defined in claim 32, comprising the step of changeably controlling variables of welding conditions based on a result of the judgment on the welding condition.

36. A method as defined in claim 23, comprising the step of using the image sensor for taking a single image showing both a molten pool and a bead portion of the welding work portion, processing the image by determining a displacement of a welding position based on data of the image taken by the camera, and correcting for the determined displacement of the welding position.

37. A method as defined in claim 36, further comprising the steps of determining a displacement of a center axis of a gap between members being joined together by butt welding from a center position of a molten pool from data of an image taken by the image sensor during the butt welding process, and moving a welding head or the members being butt welded until the determined displacement becomes zero.

38. A method as defined in claim 36, further comprising the steps of determining a value of a gap between members being joined together by butt welding from data of the image taken by the image sensor, and stopping the welding operation if the determined gap value exceeds a specified value.

39. A method as defined in claim 36, comprising the steps of determining a displacement of a center position of a molten pool from a reference line parallel to and apart by a specified distance from an edge of lapped members being joined together by lap welding from data of the image taken by the image sensor during the lap welding process, and moving a welding head or the members being welded until the determined displacement becomes zero.

40. A method as defined in claim 23, comprising the steps of using the image sensor which has a logarithmic output characteristic and is attached to a distant welding head for welding members with no contact thereto and set in a position for shooting at an angle a bright spot irradiating a welding position of members to be welded, and adjusting a level of the welding head with respect to the members in such a manner that the bright spot is placed at a specified position on an image taken by the image sensor.

41. A method as defined in claim 40, comprising the step of positioning the welding head and the members to be welded by the welding head relative to each other in a teaching stage before the welding operation in such a manner that a bright spot irradiating a welding start point on the members is set at a specified position on an image taken by the image sensor.

42. A method as defined in any one of claims 28, 32, 36 and 40, wherein the image sensor is composed of a number of light sensor circuits each of which represents a unit pixel, and the further step of initializing the light sensor circuit for removing an electric charge remaining in a parasitic capacitor of a photodiode by changing a drain voltage of a MOS transistor for converting a sensor current flowing from the photodiode into a voltage signal with a logarithmic characteristic in inverse weak state.

43. A method as defined in claim 42, wherein each of the light sensor circuits has a shutter function.

* * * * *